(12) United States Patent
Neishi et al.

(10) Patent No.: US 11,162,454 B2
(45) Date of Patent: Nov. 2, 2021

(54) STEEL PISTON

(71) Applicants: NIPPON STEEL CORPORATION, Tokyo (JP); ISUZU MOTORS LIMITED, Tokyo (JP)

(72) Inventors: Yutaka Neishi, Tokyo (JP); Yorimasa Tsubota, Fujisawa (JP); Kouji Oosato, Chitose (JP); Hirohito Eto, Fujisawa (JP); Wataru Nagai, Fujisawa (JP); Yoshitomi Yamada, Fujisawa (JP)

(73) Assignees: NIPPON STEEL CORPORATION, Tokyo (JP); ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 17/057,849

(22) PCT Filed: May 31, 2019

(86) PCT No.: PCT/JP2019/021684
§ 371 (c)(1),
(2) Date: Nov. 23, 2020

(87) PCT Pub. No.: WO2019/230938
PCT Pub. Date: Dec. 5, 2019

(65) Prior Publication Data
US 2021/0262412 A1 Aug. 26, 2021

(30) Foreign Application Priority Data

May 31, 2018 (JP) .............................. JP2018-104729

(51) Int. Cl.
*F02F 3/00* (2006.01)
*F16J 1/01* (2006.01)
(52) U.S. Cl.
CPC ............... *F02F 3/0084* (2013.01); *F16J 1/01* (2013.01); *F02F 2003/0007* (2013.01)

(58) Field of Classification Search
CPC .................. F02F 3/0084; F02F 3/0015; F02F 2003/0007; F02F 2200/04; F16J 1/00;
(Continued)

(56) References Cited

U.S. PATENT DOCUMENTS 4,586,957 A * 5/1986 Masumoto .............. C22C 45/02
148/325
5,560,283 A * 10/1996 Hannig ..................... F02F 3/10
92/208
(Continued)

FOREIGN PATENT DOCUMENTS

JP 2004181534 A 7/2004
JP 2015078693 A 4/2015

*Primary Examiner* — Grant Moubry
*Assistant Examiner* — James G Moubry
(74) *Attorney, Agent, or Firm* — Greer Burns & Crain Ltd.

(57) ABSTRACT

An upper member of a steel piston has a chemical composition which consists of, in mass %, C: 0.15 to 0.30%, Si: 0.02 to 1.00%, Mn: 0.20 to 0.80%, P: 0.020% or less, S: 0.028% or less, Cr: 0.80 to 1.50%, Mo: 0.08 to 0.40%, V: 0.10 to 0.40%, Al: 0.005 to 0.060%, N: 0.0150% or less, O: 0.0030% or less, and the balance: Fe and impurities, and satisfies Formula (1) and Formula (2), in which, at a cross section parallel to the axial direction of the upper member, the number of Mn sulfides is 100.0 per mm² or less, the number of coarse Mn sulfides having an equivalent circular diameter of 3.0 μm or more is within a range of 1.0 to 10.0 per mm², and the number of oxides is 15.0 per mm² or less.

$$0.42 \leq Mo+3V \leq 1.50 \tag{1}$$

$$V/Mo \geq 0.50 \tag{2}$$

6 Claims, 2 Drawing Sheets

(58) Field of Classification Search
CPC ...... F16J 1/01; F16J 1/001; F16J 1/005; F16J 1/006; C22C 38/001; C22C 38/002; C22C 38/02; C22C 38/04; C22C 38/06; C22C 38/20; C22C 38/22; C22C 38/24; C22C 38/26; C22C 38/44; C22C 38/46
See application file for complete search history.

(56) References Cited

U.S. PATENT DOCUMENTS

| | | | | |
|---|---|---|---|---|
| 6,311,759 | B1 * | 11/2001 | Tausig | C21D 7/13 |
| | | | | 164/113 |
| 6,547,896 | B2 * | 4/2003 | Uggowitzer | C22C 1/005 |
| | | | | 148/549 |
| 7,503,304 | B2 * | 3/2009 | Otsuka | C22C 38/42 |
| | | | | 123/193.6 |
| 8,528,513 | B2 * | 9/2013 | Haug | C22C 38/42 |
| | | | | 123/193.6 |
| 9,051,896 | B2 * | 6/2015 | Haug | C22C 38/02 |
| 2004/0129243 | A1 | 7/2004 | Robelet | |
| 2015/0107544 | A1 | 4/2015 | Lehnert et al. | |
| 2017/0218488 | A1 * | 8/2017 | Anjiki | C22C 37/04 |

* cited by examiner

STEEL PISTON

This is a National Phase Application filed under 35 U.S.C. § 371, of International Application No. PCT/JP2019/021684, filed May 31, 2019, the contents of which are incorporated by reference.

TECHNICAL FIELD

The present disclosure relates to a piston, and more particularly relates to a steel piston that is utilized in an engine or the like.

BACKGROUND ART

An engine as typified by a diesel engine or the like includes a piston. The piston is housed inside a cylinder of the engine, and performs a reciprocating motion inside the cylinder. The piston is exposed to heat of a high temperature in a combustion process during operation of the engine.

Most conventional pistons are produced by casting aluminum. However, in recent years there is a demand to further improve the combustion efficiency of engines. In the case of a piston, which is an aluminum casting product, the surface temperature during use is within the range of around 240 to 330° C.

Recently, the use of pistons in even higher combustion temperatures ranges to increase the combustion efficiency is being studied. Therefore, there is a need for a piston that can endure a situation in which the surface temperature of an upper part of the piston becomes 400° C. or more, and even 500° C. or more during use. To address such needs, steel pistons that are produced using a steel material have started to be proposed. For example, a steel piston is proposed in Patent Literature 1. In comparison to a piston that is an aluminum casting product, the melting point of the starting material of a steel piston is high. Therefore, a steel piston can be used in a higher combustion temperature range in comparison to a piston that is an aluminum casting product.

In Patent Literature 2, technology that increases the lifetime of a steel piston is proposed. Specifically, in Patent Literature 2, the following matters are pointed out with regard to the lifetime of a steel piston. During use of a steel piston in a high-temperature region, oxide scale forms on the piston crown surface of the steel piston. When the oxide scale peels off, a scale notch is formed on the piston crown. As a result of the scale notch (region from which the oxide scale peeled off) widening, a crack occurs in the piston crown of the steel piston. To solve this problem, the technology disclosed in Patent Literature 2 forms a protective layer for suppressing the formation of oxide scale on the piston crown of a steel piston.

CITATION LIST

Patent Literature

Patent Literature 1: Japanese Patent Application Publication No. 2004-181534

Patent Literature 2: Japanese Patent Application Publication No. 2015-078693

According to the aforementioned Patent Literature 2, the lifetime of a steel piston is increased by forming a protective layer on the steel piston. However, no particular consideration is given to the steel material to be used for the steel piston. In addition, in other literature also, no proposals have been made with regard to a steel material that is made suitable for a steel piston by adjusting the properties of the steel material itself.

SUMMARY OF INVENTION

Technical Problem

An objective of the present disclosure is to provide a steel piston that is applicable to even a usage environment in which the surface temperature becomes 400° C. or more. More specifically, an objective is to provide a steel piston that is (1) excellent in machinability during production of the steel piston, (2) excellent in high temperature fatigue strength and toughness during use of the steel piston, and (3) excellent in high temperature fatigue strength at a weld heat-affected zone (HAZ) in a case where the steel piston is produced by joining.

Solution to Problem

A steel piston according to the present disclosure includes:

an upper member including at least a top land of a crown portion, and a lower member arranged below the upper member and fixed to the upper member, the lower member including a skirt portion, and a piston pin hole into which a piston pin is to be inserted, the upper member having a chemical composition which consists of, in mass %, C: 0.15 to 0.30%,
Si: 0.02 to 1.00%,
Mn: 0.20 to 0.80%,
P: 0.020% or less,
S: 0.028% or less,
Cr: 0.80 to 1.50%,
Mo: 0.08 to 0.40%,
V: 0.10 to 0.40%,
Al: 0.005 to 0.060%,
N: 0.0150% or less,
O: 0.0030% or less,
Cu: 0 to 0.50%,
Ni: 0 to 1.00%,
Nb: 0 to 0.100%, and
the balance: Fe and impurities,
and satisfies Formula (1) and Formula (2),
wherein:

at a cross section parallel to an axial direction of the steel piston in the upper member, a number of Mn sulfides containing 10.0 mass % or more of Mn and containing 10.0 mass % or more of S is 100.0 per mm² or less, among the Mn sulfides, a number of coarse Mn sulfides having an equivalent circular diameter of 3.0 μm or more is within a range of 1.0 to 10.0 per mm², and a number of oxides containing 10.0 mass % or more of oxygen is 15.0 per mm² or less;

$$0.42 \leq Mo+3V \leq 1.50 \tag{1}$$

$$V/Mo \geq 0.50 \tag{2}$$

where, a content (mass %) of a corresponding element is substituted for each symbol of an element in Formula (1) and Formula (2).

Advantageous Effects of Invention

The steel piston according to the present disclosure is applicable to a usage environment in which the surface temperature of the upper member becomes 400° C. or more. More specifically, the steel piston according to the present disclosure is (1) excellent in machinability during production of the steel piston, (2) excellent in high temperature fatigue strength and toughness during use of the steel piston, and (3) excellent in high temperature fatigue strength at a weld heat-affected zone (HAZ) in a case where the steel piston is produced by joining.

DESCRIPTION OF EMBODIMENTS

Figure 1:
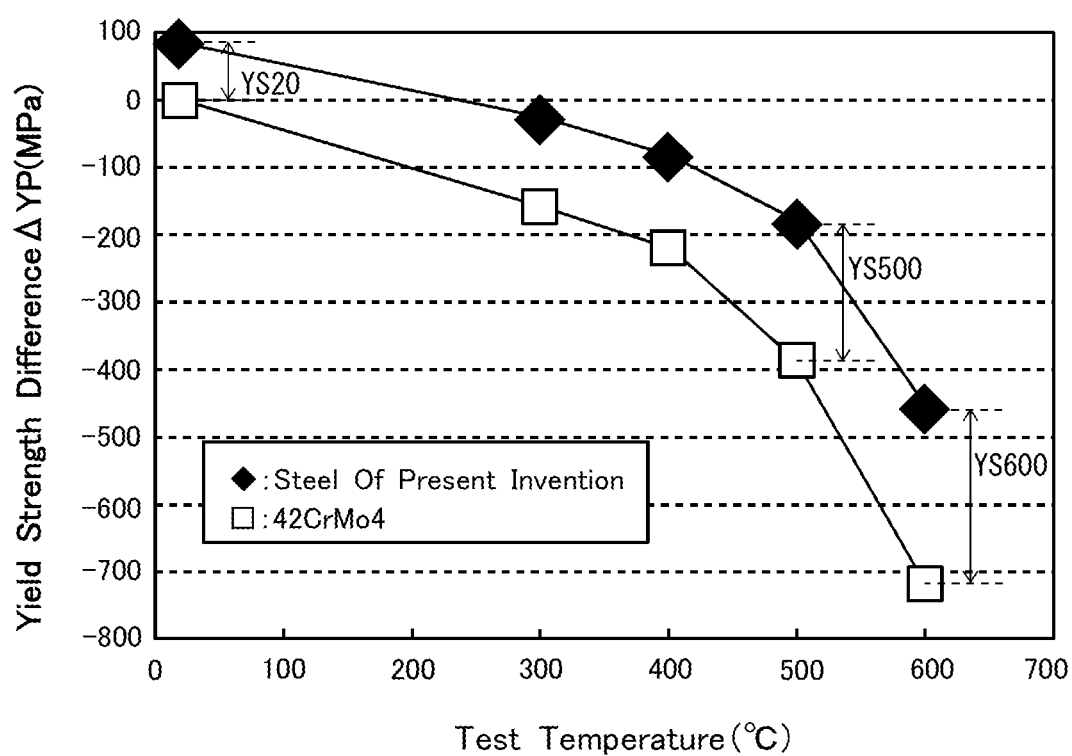
FIG. 1 is a view that illustrates that a decrease in strength during use of a steel piston of the present embodiment can be suppressed.

Initially, the present inventors conducted studies regarding the mechanical properties required for an upper member of a steel piston whose surface temperature becomes 400° C. or more during use.

In the conventional research, for example, as described in Patent Literature 2, in general the following factor has been described as the principal reason why the lifetime of a steel piston decreases.

In a case where a steel piston is utilized in an engine for the purpose of increasing the combustion efficiency, the combustion temperature can be increased. Specifically, the surface temperature of a conventional piston is in the range of around 240 to 330° C. However, when a steel piston is utilized, the surface temperature of the piston can be increased by around 100° C. compared to the conventional piston. Specifically, in the case of a steel piston, even when the surface temperature of the piston is 400° C. or more, or 500° C. or more, it is possible for the steel piston to endure such a high temperature.

In a case where a steel piston is utilized, during operation of the engine, one part of the surface of a crown portion of the upper member of the steel piston oxidizes and oxide scale forms. The adhesion of oxide scale with respect to a steel piston is low. Therefore, accompanying vertical motion of the steel piston, the oxide scale peels off from the upper member of the steel piston. On the surface of the upper member of the steel piston, the region from which oxide scale peels off is expanded as the time period for which the steel piston is used increases. Subsequently, a crack occurs in the region from which the oxide scale peeled off. The lifetime of a steel piston is determined by the above mechanism.

As described above, in the conventional research relating to steel pistons, it has been considered that the primary reason why the lifetime of a piston decreases is that oxide scale forms on the upper member during operation of the engine.

However, the present inventors considered that the primary reason why the lifetime of a steel piston decreases is not oxide scale, but that the decrease is attributable to the following mechanism.

As described above, in an engine that uses a steel piston, in order to increase the combustion efficiency, the combustion temperature is a higher temperature (500° C. or more) than in the case of an engine that uses a conventional piston. Therefore, in an engine operating state, the steel piston is subjected to thermal expansion due to the combustion temperature. As a result, compressive stress arises in the steel piston in an engine operating state. On the other hand, when the engine enters a stopped state from an operating state, the engine is cooled to normal temperature. At such time, the steel piston contracts due to the cooling. Consequently, tensile stress arises in the steel piston when the engine is in a stopped state.

As described above, a steel piston is subjected to compressive stress in a state in which the engine is operating and is subjected to tensile stress in a state in which the engine is stopped. In a steel piston, this tendency is particularly marked at an upper member at which the surface temperature during use becomes 400 to 600° C. An engine repeatedly switches between an operating state and a stopped state. When an operating state and a stopped state of an engine are repeated, the steel piston is repeatedly subjected to compressive stress and tensile stress alternately. Therefore, the present inventors considered that the occurrence of cracking which is attributable to oxide scale which had heretofore being considered the primary factor that determines the lifetime of a piston is not the primary factor in the case of the lifetime of a steel piston whose surface temperature becomes 400 to 600° C. during use. Further, the present inventors considered that the primary factor with respect to the lifetime of a steel piston is that cracking occurs due to thermal fatigue in the upper member of the steel piston as the result of the upper member of the steel piston being repeatedly subjected to compressive stress and tensile stress alternately, accompanying repeated switching between an operating state and a stopped state of the engine.

Therefore, the present inventors conducted studies regarding a method for suppressing a reduction in lifetime that is caused by thermal fatigue of a steel piston. In order to suppress the occurrence of a reduction in lifetime caused by thermal fatigue, the present inventors considered that it is effective to increase the fatigue strength in a usage environment (high-temperature usage environment) in which the surface temperature of the upper member of the steel piston becomes 400 to 600° C. In order to increase the fatigue strength, it is effective to increase strength of the upper member in a high temperature. If the strength at a high temperature can be increased, the occurrence of cracks or the like caused by thermal fatigue will be suppressed. As a result, the lifetime of a steel piston that is used in a high-temperature usage environment will be improved.

In general, the strength of a steel material decreases as the temperature increases. Therefore, if the strength at a normal temperature of the steel material constituting the upper member is increased, although the strength will decrease accompanying a rise in temperature, the strength can be maintained to a certain extent even in a high-temperature region in which the surface temperature becomes around 400 to 600° C.

However, a steel piston is produced by performing hot forging of a steel material that is a starting material to thereby produce an intermediate product having a rough shape, and thereafter performing a cutting process. Consequently, if the strength at a normal temperature of a steel material that is used for a steel piston for use in a high-temperature usage environment is increased, the cutting process after producing the intermediate product will be difficult. Therefore, a steel material that is used for the upper member of a steel piston for use in a high-temperature usage environment is required to have machinability prior to being used as a steel piston, and it is necessary for the steel material to have high fatigue strength at a high temperature during use as a steel piston. In a steel piston, such characteristics are required, in particular, for the upper member that includes at least a top land of a crown portion. In addition, high toughness is also required during use as a steel piston. When considering the relation between temperature and toughness, the lower that the temperature is, the lower the toughness will be. Therefore, if the toughness at a normal temperature of a steel piston is sufficiently increased, the toughness in the range of 400 to 600° C. will also naturally increase.

Therefore, the present inventors conducted studies regarding an upper member that is excellent in machinability during production of a steel piston, and is also excellent in high temperature fatigue strength and excellent in toughness during use of the steel piston.

When the engine is in an operating state, the upper member of a steel piston is exposed to a high-temperature region in which the surface temperature is 400° C. or more for an extended time period. Therefore, prior to being used as the upper member of the steel piston, the strength of the steel material is kept low to maintain machinability. Subsequently, during use of the steel piston for an extended time period in a high-temperature usage environment in which the surface temperature becomes 400 to 600° C. in an engine operating state, the high temperature strength of the upper member of the steel piston is increased by aging precipitation. In this case, while maintaining the machinability of the steel material, the high temperature fatigue strength in a high-temperature region of the upper member of the steel piston can be increased in an engine operating state.

In addition, in the process for producing a steel piston, in some cases the steel piston is formed by friction joining or laser joining of an upper member (member including at least a top land that corresponds to an upper part of a crown portion) of the steel piston and a lower member (member including a skirt portion and a piston pin hole) of the steel piston. In a case where the aforementioned members are joined by one of these joining methods, a HAZ (heat-affected zone) that is affected by heat during joining is formed in a region in the vicinity of the joining interface. Therefore, it is necessary to secure the high temperature fatigue strength of a HAZ during use of the steel piston.

As described above, the present inventors considered that in the case of a steel piston, it is necessary to (1) have excellent machinability during production of the steel piston, (2) have excellent high temperature fatigue strength and excellent toughness at an upper member during use of the steel piston, and (3) secure the high temperature fatigue strength of a HAZ in a case where the steel piston is produced by joining. Therefore, the present inventors conducted studies regarding the chemical composition and structure of a steel material to be used for an upper member of a steel piston for use in a high-temperature usage environment that satisfies the characteristics described in the foregoing (1) to (3). As a result, the present inventors obtained the following findings.

[Compatibly Achieving Both Machinability During Production and High Temperature Fatigue Strength and Toughness During Piston Use]

The present inventors first conducted studies regarding the chemical composition of an upper member that is excellent in machinability when producing the steel piston, and is excellent in fatigue strength (high temperature fatigue strength) and toughness in a high-temperature region when using the steel piston. As a result, the present inventors discovered that if the chemical composition of (a steel material) of an upper member consists of, in mass %, C: 0.15 to 0.30%, Si: 0.02 to 1.00%, Mn: 0.20 to 0.80%, P: 0.020% or less, S: 0.028% or less, Cr: 0.80 to 1.50%, Mo: 0.08 to 0.40%, V: 0.10 to 0.40%, Al: 0.005 to 0.060%, N: 0.0150% or less, O: 0.0030% or less, Cu: 0 to 0.50%, Ni: 0 to 1.00%, Nb: 0 to 0.100%, and the balance: Fe and impurities, and satisfies Formula (1) and Formula (2), the upper member is excellent in machinability during steel piston production, and can suppress a decrease in strength in a high-temperature region when used as the upper member of a steel piston:

$$0.42 \leq Mo+3V \leq 1.50 \quad (1)$$

$$V/Mo \geq 0.50 \quad (2)$$

where, a content (mass %) of a corresponding element is substituted for each symbol of an element in Formula (1) and Formula (2). This point is described in detail hereunder.

A steel piston is produced, for example, by the following process. First, steel material for a steel piston is subjected to hot forging to produce intermediate products (an intermediate product of an upper member, and an intermediate product of a lower member). The intermediate products are subjected to a thermal refining treatment (quenching and tempering). After undergoing the thermal refining treatment, the upper member and the lower member are joined by friction joining or laser joining to produce a joined product. The joined product is subjected to machining such as cutting to produce a steel piston as an end product. Alternatively, the upper member and the lower member produced by hot forging are subjected to friction joining or laser joining to produce a joined product. A thermal refining treatment (quenching and tempering) is performed on the joined product. After undergoing the thermal refining treatment, the joined product is subjected to machining such as cutting to produce a steel piston as the end product. In short, production patterns for producing a piston for use in a high-temperature usage environment include, for example, the following two patterns.

Pattern 1: hot forging→thermal refining treatment→joining→machining

Pattern 2: hot forging→joining→thermal refining treatment→machining

In the steel material used for the upper member of the steel piston of the present embodiment, in order to improve the machinability, an upper limit of the C content is kept to 0.30%. In the tempering during the thermal refining treatment process of the aforementioned production process, tempering is performed at a temperature (400 to 600° C.) of the same level as the surface temperature of the steel piston during engine operation. By this means, the hardness of the surface of the intermediate products after tempering can be lowered. Therefore, on the premise that a condition regarding the number of coarse Mn sulfides that is described later is satisfied, high machinability is obtained.

In addition, the steel material used for the upper member of the steel piston of the present embodiment contains Mo in an amount of 0.08 to 0.40% and V in an amount of 0.10 to 0.40% as aging precipitation elements during use of the steel piston in a high-temperature usage environment in which the surface temperature becomes 400 to 600° C. By containing these aging precipitation elements in combination, in a temperature region (500 to 600° C.) of the surface of the steel piston during thermal refining treatment and during use, fine carbides containing Mo and/or V are subjected to aging precipitation within the upper member of the steel piston. By the aging precipitation that is caused by containing a combination of Mo and V, the high temperature strength of the steel piston during engine operation is secured. In this case, a decrease in the lifetime of the steel piston due to thermal fatigue can be suppressed.

To obtain this effect, the Mo content and the V content of the upper member of the steel piston for use in a high-temperature usage environment satisfy the following Formula (1) and Formula (2):

$$0.42 \leq Mo + 3V \leq 1.50 \quad (1)$$

$$V/Mo \geq 0.50 \quad (2)$$

where, a content (mass %) of a corresponding element is substituted for each symbol of an element in Formula (1) and Formula (2). This point is described in detail hereunder.

It is defined that F1=Mo+3V. F1 is an index that indicates the ability to strengthen the high temperature strength by aging precipitation of Mo and V. If F1 is less than 0.42, carbides containing Mo and/or V (Mo carbides, V carbides, and composite carbides containing Mo and V) cannot be subjected to aging precipitation sufficiently, and the desired high temperature strength of the steel material is not obtained. On the other hand, if F1 is more than 1.50, the effect is saturated, and the toughness of the steel material also decreases. If F1 satisfies Formula (1), on the premise that Formula (2) is satisfied, carbides containing Mo and/or V sufficiently precipitate, and the high temperature strength of the steel material increases. As a result, the fatigue strength at a high temperature also increases. In addition, the toughness of the steel material increases.

It is defined that F2=V/Mo. In a case where Mo and V in combination are contained so as to satisfy Formula (1), and F2 satisfies Formula (2), in comparison to a case where Mo alone is contained or V alone is contained, a greater quantity of fine carbides containing Mo and/or V sufficiently precipitate in the temperature region of 400 to 600° C. and the high temperature strength of the steel material increases. Although the reason for this is uncertain, it is considered that the reason is as follows.

In a case where Mo alone is contained, Mo forms carbides in a temperature region around 500° C. and is subjected to aging precipitation. In a case where V alone is contained, V forms carbides in a temperature region around 600° C. that is higher than the temperature region for Mo, and is subjected to aging precipitation.

On the other hand, in a case where Mo and V are contained in combination, Mo carbides precipitate in a temperature region around 500° C. In addition, when the Mo carbides precipitate, precipitation of V carbides that originally would precipitate at around 600° C. is induced by precipitation of the Mo carbides, and the V carbides precipitate as fine composite carbides containing Mo and V in a temperature region lower than 600° C. It is difficult for the composite carbides containing Mo and V to grow even if the temperature increases after precipitation, and the composite carbides are maintained as they are as fine composite carbides. In addition, in a temperature region around 600° C., V in a dissolved state that did not precipitate as composite carbides finely precipitates as carbides.

F2 is an index that indicates the ease with which composite carbides of Mo and V precipitate. If F2 is less than 0.50, composite carbides containing Mo and V do not sufficiently precipitate. Therefore, even if F1 satisfies Formula (1), sufficient high temperature strength will not be obtained. If F1 satisfies Formula (1) and F2 satisfies Formula (2), a decrease in strength in the high-temperature region of 400 to 600° C. can be suppressed, and excellent high temperature strength and high temperature fatigue strength are obtained.

FIG. 1 is a view illustrating the fact that a decrease in strength during use of the steel piston can be suppressed. In FIG. 1, a "♦" mark indicates a test result for the steel material used for the upper member of the steel piston for use in a high-temperature usage environment of the present embodiment having the aforementioned chemical composition that satisfies Formula (1) and Formula (2). A "□" mark indicates a test result for a representative example (equivalent to 42CrMo4 of the ISO Standard; hereunder, referred to as "steel material of the Comparative Example") of a conventional steel material for a steel piston. The ordinate in FIG. 1 represents differential values of the yield strength at respective processing temperatures in a case where the yield strength YS of the steel material of the Comparative Example in the atmosphere at a temperature of 20° C. is adopted as a reference value. Note that, the steel material used for the upper member of the steel piston for use in a high-temperature usage environment of the present embodiment also satisfied requirements for inclusions that are described later. FIG. 1 was obtained by conducting the following test.

Assuming a usage state as a steel piston, the steel material to be used for the upper member of the steel piston of the present embodiment having the aforementioned chemical composition and the steel material of the Comparative Example were subjected to quenching at 920° C., and thereafter were subjected to tempering at 600° C. (assumed usage temperature of a steel piston). Each steel material after tempering was subjected to a tensile test conforming to JIS Z2241 (2011) in a temperature range of 20° C. to 600° C. in the atmosphere, and yield strengths were obtained at respective temperatures. FIG. 1 was created based on the obtained yield strengths.

Referring to FIG. 1, the amount of decrease in yield strength accompanying a rise in temperature of the steel material ("♦" marks) used for the upper member of the steel piston of the present embodiment is less than the amount of decrease in yield strength accompanying a rise in temperature of the steel material of the Comparative Example ("□" marks). More specifically, compared to a differential value YS20 obtained by subtracting the yield strength of the steel material of the Comparative Example at 20° C. from the yield strength of the steel material used for the upper member of the steel piston of the present embodiment at 20° C., a differential value YS500 at 500° C. is larger, and a differential value YS600 at 600° C. is even larger. This fact indicates that the amount of decrease in yield strength accompanying a rise in temperature of the steel material used for the upper member of the steel piston of the present embodiment is less than the amount of decrease in yield strength accompanying a rise in temperature of the steel material of the Comparative Example. This indicates that, with respect to the steel material used for the upper member of the steel piston of the present embodiment, during use as the upper member of the steel piston, a decrease in yield strength accompanying a rise in temperature can be suppressed because of the precipitation of fine aging precipitates.

[Machinability and High Temperature Fatigue Strength of Steel Material Including HAZ by Control of Inclusions]

The present inventors further discovered that, with respect to inclusions contained in the upper member of the steel piston of the present embodiment, if all of the following requirements (A) to (C) are satisfied, it is possible to secure (1) machinability during steel piston production, (2) high temperature fatigue strength during use of the steel piston, and (3) high temperature strength in a HAZ region during use of the steel piston:

(A) The number of Mn sulfides containing 10.0 mass % or more of Mn and containing 10.0 mass % or more of S is 100.0 per mm$^2$ or less.

(B) Among the Mn sulfides, the number of coarse Mn sulfides that have an equivalent circular diameter of 3.0 µm or more is within the range of 1.0 to 10.0 per mm$^2$.

(C) The number of oxides containing 10.0 mass % or more of oxygen is 15.0 per mm$^2$ or less.

This point is described in detail hereunder.

In the steel material used for the upper member of the steel piston of the present embodiment, Mn sulfides and oxides are present in the steel. In the present description, Mn sulfides and oxides are defined as follows.

Mn sulfides: inclusions containing 10.0 mass % or more of Mn and 10.0 mass % or more of S Oxides: inclusions containing 10.0 mass % or more of O Note that, in the present description, inclusions containing 10.0 mass % or more of Mn, 10.0 mass % or more of S, and 10.0 mass % or more of O (oxygen) are defined as "oxides". In other words, in the present description, the term "Mn sulfides" means inclusions that contain 10.0 mass % or more of Mn and 10.0 mass % or more of S, and in which the O content is less than 10.0%.

In the present embodiment, as described in (A) and (C) above, the number of Mn sulfides and oxides that account for a major portion of the inclusions contained in the steel material is made as small as possible. As described above, in some cases a steel piston is formed by friction joining or laser joining. In such a case, a HAZ exists in the steel piston. In some cases, the fatigue strength of a HAZ is lower than the fatigue strength of other regions. To secure the fatigue strength of a HAZ, the number of Mn sulfides and oxides that are inclusions is lowered as much as possible.

On the other hand, the steel material used for the upper member of a steel piston also needs to have machinability. Mn sulfides enhance the machinability of the steel material. However, unless the Mn sulfides are of a certain size or more, the Mn sulfides will not contribute to machinability. Therefore, in the present embodiment, on the premise that (A) and (C) are satisfied, as described in (B) above, the number of coarse Mn sulfides having an equivalent circular diameter of 3.0 µm or more is made to fall within the range of 1.0 to 10.0 per mm$^2$. In this case, while securing the number of coarse Mn sulfides required for the machinability of the steel material used for the upper member of the steel piston by means of (B), the total number of inclusions contained in the steel material is kept as low as possible by means of (A) and (C) and the fatigue strength of a HAZ of the steel piston is secured.

Note that, the aforementioned steel material is applied to at least the upper member of the steel piston for use in a high-temperature usage environment. However, the lower member of the steel piston for use in a high-temperature usage environment may also be composed of the aforementioned steel material, and not just the upper member. In other words, the lower member of the steel piston may have a chemical composition which consists of, in mass %, C: 0.15 to 0.30%, Si: 0.02 to 1.00%, Mn: 0.20 to 0.80%, P: 0.020% or less, S: 0.028% or less, Cr: 0.80 to 1.50%, Mo: 0.08 to 0.40%, V: 0.10 to 0.40%, Al: 0.005 to 0.060%, N: 0.0150% or less, O: 0.0030% or less, Cu: 0 to 0.50%, Ni: 0 to 1.00%, Nb: 0 to 0.100%, and the balance: Fe and impurities, and satisfies Formula (1) and Formula (2), wherein, at a cross section parallel to an axial direction of the steel piston in the lower member, a number of Mn sulfides containing 10.0 mass % or more of Mn and containing 10.0 mass % or more of S may be 100.0 per mm$^2$ or less, among the Mn sulfides a number of coarse Mn sulfides having an equivalent circular diameter of 3.0 µm or more may be within a range of 1.0 to 10.0 per mm$^2$, and a number of oxides containing 10.0 mass % or more of oxygen may be 15.0 per mm$^2$ or less. Further, the chemical composition of the lower member may be different from the chemical composition of the upper member. Preferably, the lower member is composed of a steel material. However, the lower member may be composed of an alloy or a metal other than a steel material. The lower member may be composed of, for example, a steel material having a chemical composition that is different from the chemical composition of the steel material constituting the aforementioned upper member.

A steel piston according to the present embodiment that has been completed based on the above findings has the following structures.

[1] A steel piston, including:

an upper member including at least a top land of a crown portion, and a lower member arranged below the upper member and fixed to the upper member, the lower member including a skirt portion and a piston pin hole into which a piston pin is to be inserted;

the upper member having a chemical composition which consists of, in mass %,

C: 0.15 to 0.30%,
Si: 0.02 to 1.00%,
Mn: 0.20 to 0.80%,
P: 0.020% or less,
S: 0.028% or less,
Cr: 0.80 to 1.50%,
Mo: 0.08 to 0.40%,
V: 0.10 to 0.40%,
Al: 0.005 to 0.060%,
N: 0.0150% or less,
O: 0.0030% or less,
Cu: 0 to 0.50%,
Ni: 0 to 1.00%, and
Nb: 0 to 0.100%, and
the balance: Fe and impurities,
and satisfies Formula (1) and Formula (2),
wherein:

at a cross section parallel to an axial direction of the steel piston in the upper member, a number of Mn sulfides containing 10.0 mass % or more of Mn and containing 10.0 mass % or more of S is 100.0 per mm$^2$ or less, among the Mn sulfides, a number of coarse Mn sulfides having an equivalent circular diameter of 3.0 µm or more is within a range of 1.0 to 10.0 per mm$^2$, and a number of oxides containing 10.0 mass % or more of oxygen is 15.0 per mm$^2$ or less;

$$0.42 \leq Mo + 3V \leq 1.50 \tag{1}$$

$$V/Mo \geq 0.50 \tag{2}$$

where, a content (mass %) of a corresponding element is substituted for each symbol of an element in Formula (1) and Formula (2).

[2] The steel piston according to [1], wherein:
the chemical composition of the upper member contains one or more elements selected from the group consisting of:
Cu: 0.01 to 0.50%,
Ni: 0.01 to 1.00%, and
Nb: 0.010 to 0.100%.

[3] The steel piston according to [1] or [2], wherein:
the chemical composition of the lower member is different from the chemical composition of the upper member.

[4] The steel piston according to [1] or [2],
the lower member having a chemical composition which consists of, in mass %,
C: 0.15 to 0.30%,
Si: 0.02 to 1.00%,
Mn: 0.20 to 0.80%,
P: 0.020% or less,
S: 0.028% or less,
Cr: 0.80 to 1.50%,
Mo: 0.08 to 0.40%,
V: 0.10 to 0.40%,
Al: 0.005 to 0.060%,
N: 0.0150% or less,
O: 0.0030% or less,
Cu: 0 to 0.50%,
Ni: 0 to 1.00%.
Nb: 0 to 0.100%, and
the balance: Fe and impurities,
and satisfies Formula (1) and Formula (2),
wherein:
at a cross section parallel to an axial direction of the steel piston in the lower member,
a number of Mn sulfides containing 10.0 mass % or more of Mn and containing 10.0 mass % or more of S is 100.0 per mm$^2$ or less,
among the Mn sulfides, a number of coarse Mn sulfides having an equivalent circular diameter of 3.0 μm or more is within a range of 1.0 to 10.0 per mm$^2$, and
a number of oxides containing 10.0 mass % or more of oxygen is 15.0 per mm$^2$ or less;

$$0.42 \leq Mo+3V \leq 1.50 \quad (1)$$

$$V/Mo \geq 0.50 \quad (2)$$

where, a content (mass %) of a corresponding element is substituted for each symbol of an element in Formula (1) and Formula (2).

Hereunder, the steel piston according to the present embodiment is described in detail. The symbol "%" used in relation to elements means "mass %", unless specifically stated otherwise.

[Structure of Steel Piston]

Figure 2:
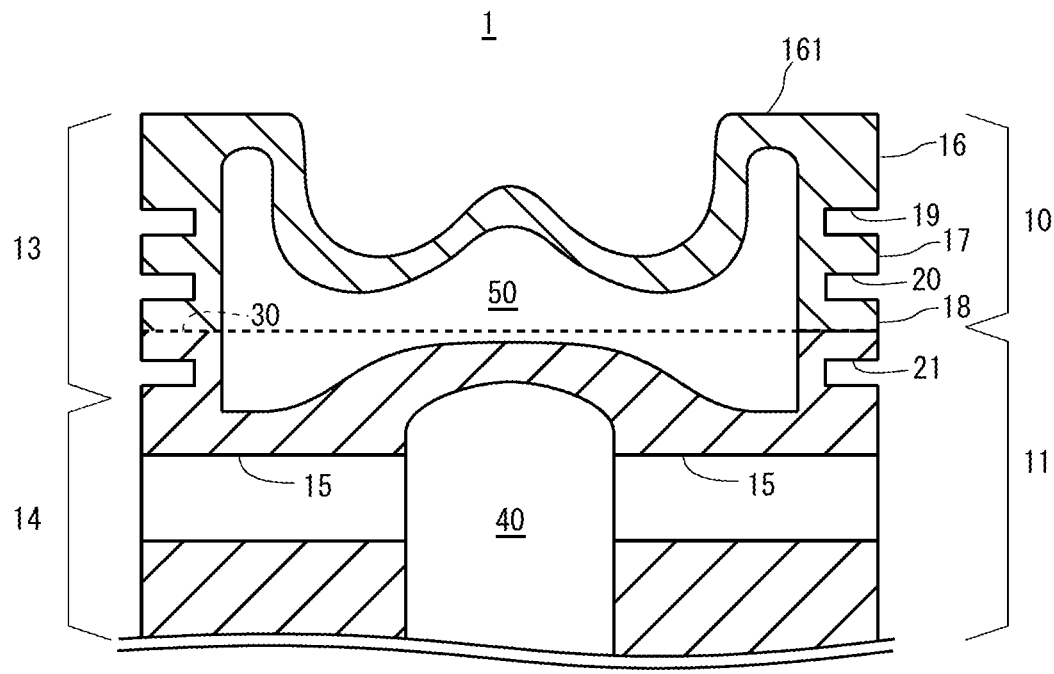
FIG. 2 is a cross-sectional drawing of a steel piston according to the present embodiment, which is a cross-sectional drawing obtained in a case where the steel piston was cut along a plane including the central axis of the steel piston.

FIG. 2 is a cross-sectional drawing of the steel piston according to the present embodiment, which is a cross-sectional drawing obtained in a case where the steel piston was cut along a plane including the central axis of the steel piston.

Referring to FIG. 2, a steel piston 1 of the present embodiment has a cylindrical shape. The steel piston 1 includes an upper member 10 and a lower member 11. The upper member 10 is the upper part of the steel piston 1, and includes at least a top land 16 of a crown portion 13.

The lower member 11 is arranged below the upper member 10, and is fixed to the upper member 10. In FIG. 2, the lower member 11 is joined to the upper member 10 at a joining face 30. More specifically, the lower member 11 is joined by friction joining or laser joining to the upper member 10. Preferably, the diameter of the upper end face of the lower member 11 is the same as the diameter of the lower end face of the upper member 10.

The lower member 11 includes at least a skirt portion 14 and a piston pin hole 15. The skirt portion 14 is arranged below the crown portion 13, and the upper end of the skirt portion 14 is connected to the lower end of the crown portion 13. A pair of the piston pin holes 15 are formed in the skirt portion 14, and a piston pin is insertable therein. A gap 40 is formed between the pair of piston pin holes 15. The small end of an unshown connecting rod is arranged in the gap 40. A hole in the small end of the connecting rod and the pair of piston pin holes are arranged coaxially. A piston pin is inserted into the hole formed in the small end of the connecting rod and into the pair of piston pin holes 15 to thereby connect the steel piston and the connecting rod.

In FIG. 2, a cavity 50 is defined by the lower face of the upper member 10 and the upper face of the lower member 11. A coolant, for example, circulates through the cavity 50 and cools the steel piston 1 during use. Note that, in FIG. 2, although the steel piston 1 includes the cavity 50, the shape of the cavity 50 is not limited to the shape illustrated in FIG. 2. Further, the steel piston 1 need not include the cavity 50. In other words, the cavity 50 need not be formed between the lower face of the upper member 10 and the upper face of the lower member 11.

In FIG. 2, the crown portion 13 of the steel piston 1 includes the top land 16, a plurality of lands 17 and 18 and a plurality of ring grooves 19 to 21. The top land 16 includes a top face 161 that is the uppermost end of the steel piston 1. The land 17 is the peripheral surface of the crown portion 13 and is arranged below the top land 16, and the ring groove 19 is formed between the top land 16 and the land 17. The land 18 is the peripheral surface of the crown portion 13 and is arranged below the land 17, and the ring groove 20 is formed between the land 17 and the land 18. The skirt portion 14 is formed below the land 18, and the ring groove 21 is formed between the land 18 and the skirt portion 14. A piston ring can be arranged in each of the ring grooves 19 to 21.

In FIG. 2, the upper member 10 does not include the entire crown portion 13, but includes only the top land 16, the land 17 and the upper part of the land 18 of the entire crown portion 13. However, the structure of the upper member 10 is not limited to this structure. In a piston for use in a high-temperature usage environment, the surface temperature of the top land 16 of the upper member 10 becomes the highest temperature. Therefore, it suffices that the upper member 10 includes at least the top land 16 of the crown portion 13. In other words, the upper member 10 may include the top land 16 of the crown portion 13, and not include a portion from the land 17 downward. In this case, of the entire piston, the land 17 and the portion that is below the land 17 will be the lower member 11. The upper member 10 may include the entire crown portion 13. In this case, the skirt portion 14 will be the lower member 11. In FIG. 2, the crown portion 13 includes the top land 16, the plurality of lands 17 and 18 and the plurality of ring grooves 19 to 21. However, the crown portion 13 may be composed of the top land 16, the single land 17 and the single ring groove 19.

[Chemical Composition of Upper Member 10]

The chemical composition of the upper member 10 of the steel piston 1 for use in a high-temperature usage environment contains the following elements.

C: 0.15 to 0.30%

Carbon (C) increases the strength of the steel material. If the C content is less than 0.15%, this effect will not be sufficiently obtained even when the contents of the other elements are within the ranges of the present embodiment. On the other hand, if the C content is more than 0.30%, even when the contents of the other elements are within the ranges of the present embodiment, the machinability of the steel material will decrease when producing the steel piston, and the toughness of the steel material will also decrease. Therefore, the C content is within the range of 0.15 to 0.30%. A preferable lower limit of the C content is 0.16%, more preferably is 0.17%, further preferably is 0.18%, and more preferably is 0.19%. A preferable upper limit of the C content is 0.29%, more preferably is 0.28%, further preferably is 0.27%, more preferably is 0.26%, and further preferably is 0.25%.

Si: 0.02 to 1.00%

Silicon (Si) deoxidizes the steel. In addition, Si increases the strength of ferrite. If the Si content is less than 0.02%, these effects will not be sufficiently obtained even when the contents of the other elements are within the ranges of the present embodiment. On the other hand, if the Si content is more than 1.00%, even when the contents of the other elements are within the ranges of the present embodiment, the machinability of the steel material will decrease when producing the steel piston. Therefore, the Si content is within the range of 0.02 to 1.00%. A preferable lower limit of the Si content is 0.03%, more preferably is 0.04%, further preferably is 0.10%, more preferably is 0.20%, and further preferably is 0.25%. A preferable upper limit of the Si content is 0.90%, more preferably is 0.85%, further preferably is 0.80%, and more preferably is 0.78%.

Mn: 0.20 to 0.80%

Manganese (Mn) enhances the hardenability of the steel material, and increases the strength of the steel material by solid-solution strengthening. If the Mn content is less than 0.20%, even when the contents of the other elements are within the ranges of the present embodiment, these effects will not be sufficiently obtained. On the other hand, if the Mn content is more than 0.80%, even when the contents of the other elements are within the ranges of the present embodiment, the machinability of the steel material will decrease. Therefore, the Mn content is within the range of 0.20 to 0.80%. A preferable lower limit of the Mn content is 0.21%, more preferably is 0.22%, further preferably is 0.25%, more preferably is 0.30%, and further preferably is 0.35%. A preferable upper limit of the Mn content is 0.79%, more preferably is 0.78%, further preferably is 0.77%, more preferably is 0.76%, and further preferably is 0.75%.

P: 0.020% or Less

Phosphorus (P) is an impurity that is unavoidably contained. In other words, the P content is more than 0%. If the P content is more than 0.020%, even when the contents of the other elements are within the ranges of the present embodiment, P will segregate at grain boundaries and will decrease the strength of the steel material. Therefore, the P content is 0.020% or less. A preferable upper limit of the P content is 0.019%, more preferably is 0.018%, further preferably is 0.017%, and more preferably is 0.015%. The P content is preferably as low as possible. However, excessively reducing the P content will incur a production cost. Therefore, when industrial production is taken into consideration, a preferable lower limit of the P content is 0.001%, and more preferably is 0.002%.

S: 0.028% or Less

Sulfur (S) is unavoidably contained. In other words, the S content is more than 0%. S combines with Mn to form Mn sulfides and enhances the machinability of the steel material. If even a small amount of S is contained, this effect is obtained to a certain extent. On the other hand, if the S content is more than 0.028%, even when the contents of the other elements are within the ranges of the present embodiment, coarse Mn sulfides will form or an excessive amount of Mn sulfides will form. In this case, the high temperature strength and high temperature fatigue strength will decrease. Therefore, the S content is 0.028% or less. A preferable lower limit of the S content for effectively obtaining the aforementioned effect is 0.001%, more preferably is 0.003%, further preferably is 0.005%, and more preferably is 0.009%. A preferable upper limit of the S content is 0.025%, more preferably is 0.023%, further preferably is 0.020%, more preferably is 0.019%, further preferably is 0.018%, and more preferably is 0.015%.

Cr: 0.80 to 1.50%

Chromium (Cr) enhances the strength of the steel material. If the Cr content is less than 0.80%, even when the contents of the other elements are within the ranges of the present embodiment, this effect will not be sufficiently obtained. On the other hand, if the Cr content is more than 1.50%, even when the contents of the other elements are within the ranges of the present embodiment, Cr carbides will form and the fatigue strength at a high temperature will decrease. In addition, if the Cr content is more than 1.50%, the machinability of the steel material will decrease. Therefore, the Cr content is within the range of 0.80 to 1.50%. A preferable lower limit of the Cr content is 0.82%, more preferably is 0.84%, further preferably is 0.90%, and more preferably is 0.95%. A preferable upper limit of the Cr content is 1.45%, more preferably is 1.42%, further preferably is 1.40%, more preferably is 1.38%, and further preferably is 1.36%.

Mo: 0.08 to 0.40%

Molybdenum (Mo) is subjected to aging precipitation together with V, described later, in a usage temperature range (500 to 600° C.) of the steel piston, and forms precipitates. By this means, the high temperature strength and high temperature fatigue strength of the steel piston in an engine operating state can be maintained at a high level. If the Mo content is less than 0.08%, even when the contents of the other elements are within the ranges of the present embodiment, this effect will not be sufficiently obtained. On the other hand, if the Mo content is more than 0.40%, even when the contents of the other elements are within the ranges of the present embodiment, the strength of the steel material will become excessively high, and the toughness will decrease. Therefore, the Mo content is within the range of 0.08 to 0.40%. A preferable lower limit of the Mo content is 0.09%, more preferably is 0.10%, further preferably is 0.11%, more preferably is 0.12%, and further preferably is 0.13%. A preferable upper limit of the Mo content is 0.39%, more preferably is 0.38%, further preferably is 0.36%, more preferably is 0.34% and further preferably is 0.32%.

V: 0.10 to 0.40%

Vanadium (V) is subjected to aging precipitation together with the aforementioned Mo in a usage temperature range (500 to 600° C.) of the steel piston, and forms precipitates. By this means, the high temperature strength and fatigue strength of the steel piston in an engine operating state can be maintained at a high level. If the V content is less than 0.10%, even when the contents of the other elements are within the ranges of the present embodiment, this effect will not be sufficiently obtained. On the other hand, if the V content is more than 0.40%, even when the contents of the other elements are within the ranges of the present embodiment, the strength of the steel material will become excessively high, and the toughness will decrease. Therefore, the V content is within the range of 0.10 to 0.40%. A preferable lower limit of the V content is 0.11%, more preferably is 0.12%, further preferably is 0.13%, and more preferably is 0.14%. A preferable upper limit of the V content is 0.39%, more preferably is 0.38%, further preferably is 0.37%, more preferably is 0.36% and further preferably is 0.35%.

Al: 0.005 to 0.060%

Aluminum (Al) deoxidizes the steel. If the Al content is less than 0.005%, even when the contents of the other elements are within the ranges of the present embodiment, this effect will not be obtained. On the other hand, if the Al content is more than 0.060%, even when the contents of the other elements are within the ranges of the present embodiment, oxides (inclusions) will excessively form, and the high temperature strength and fatigue strength of a steel piston that includes a HAZ region will decrease. Therefore, the Al content is within the range of 0.005 to 0.060%. A preferable lower limit of the Al content is 0.007%, more preferably is 0.008%, further preferably is 0.010%, more preferably is 0.012%, and further preferably is 0.014%. A preferable upper limit of the Al content is 0.058%, more preferably is 0.056%, further preferably is 0.052%, more preferably is 0.050%, further preferably is 0.048% and more preferably is 0.045%.

N: 0.0150% or Less

Nitrogen (N) is an impurity that is unavoidably contained. In other words, the N content is more than 0%. If the N content is more than 0.0150%, even when the contents of the other elements are within the ranges of the present embodiment, the hot workability of the steel material will decrease. Therefore, the N content is 0.0150% or less. A preferable upper limit of the N content is 0.0140%, more preferably is 0.0130%, further preferably is 0.0125%, and more preferably is 0.0120%. The N content is preferably as low as possible. However, excessively reducing the N content will incur a production cost. Therefore, when industrial production is taken into consideration, a preferable lower limit of the N content is 0.0010%, and more preferably is 0.0015%.

O: 0.0030% or Less

Oxygen (O) is an impurity that is unavoidably contained. In other words, the O content is more than 0%. If the O content is more than 0.0030%, even when the contents of the other elements are within the ranges of the present embodiment, oxides will excessively form, and the high temperature strength and fatigue strength of a steel piston that includes a HAZ region will decrease. Therefore, the O content is 0.0030% or less. A preferable upper limit of the O content is 0.0028%, more preferably is 0.0026%, further preferably is 0.0022%, more preferably is 0.0020%, and further preferably is 0.0018%. The O content is preferably as low as possible. However, excessively reducing the O content will incur a production cost. Therefore, when industrial production is taken into consideration, a preferable lower limit of the O content is 0.001%, and more preferably is 0.002%.

Balance: Fe and Impurities

The balance of the chemical composition of the upper member of the steel piston for use in a high-temperature usage environment according to the present embodiment is Fe and impurities. Here, the term "impurities" refers to components which, during industrial production of the steel material, are mixed in from ore or scrap that is used as a raw material or from the production environment or the like, and which are not components that are intentionally contained in the steel.

All elements other than the aforementioned impurities may be mentioned as examples of impurities. The balance may include only one kind of impurity or may include two or more kinds of impurity. Examples of impurities other than the aforementioned impurities include Ca, B, Sb, Sn, W, Co, As, Pb, Bi and H. It is possible for a case to arise in which these elements are contained, for example, as impurities having the following contents.

Ca: 0 to 0.0005%, B: 0 to 0.0005%, Sb: 0 to 0.0005%, Sn: 0 to 0.0005%, W: 0 to 0.0005%, Co: 0 to 0.0005%, As: 0 to 0.0005%, Pb: 0 to 0.0005%, Bi: 0 to 0.0005% and H: 0 to 0.0005%.

[Regarding Optional Elements]

The chemical composition of the upper member of the steel piston of the present embodiment may also contain one or more elements selected from the group consisting of Cu: 0 to 0.50%, Ni: 0 to 1.00% and Nb: 0 to 0.100% in lieu of a part of Fe.

Cu: 0 to 0.50%

Copper (Cu) is an optional element, and need not be contained. In other words, the Cu content may be 0%. When contained, Cu enhances the hardenability of the steel material and increases the strength of the steel material. As long as the Cu content is more than 0%, these effects will be obtained to a certain extent. On the other hand, if the Cu content is more than 0.50%, even when the contents of the other elements are within the ranges of the present embodiment, the hot workability of the steel material will decrease. Therefore, the Cu content is within the range of 0 to 0.50%. A preferable lower limit of the Cu content for more effectively enhancing the aforementioned effects is 0.01%, more preferably is 0.02%, further preferably is 0.04%, and more preferably is 0.05%. A preferable upper limit of the Cu content is 0.48%, more preferably is 0.46%, further preferably is 0.44%, and more preferably is 0.40%.

Ni: 0 to 1.00%

Nickel (Ni) is an optional element, and need not be contained. In other words, the Ni content may be 0%. When contained, Ni enhances the hardenability of the steel material and increases the strength of the steel material. As long as the Ni content is more than 0%, these effects will be obtained to a certain extent. On the other hand, if the Ni content is more than 1.00%, even when the contents of the other elements are within the ranges of the present embodiment, the effect of the Ni will be saturated and, in addition, the cost of the raw materials will increase. Therefore, the Ni content is within the range of 0 to 1.00%. A preferable lower limit of the Ni content for effectively obtaining the aforementioned effects is 0.01%, more preferably is 0.02%, further preferably is 0.04%, and more preferably is 0.05%. A preferable upper limit of the Ni content is 0.98%, more preferably is 0.90%, further preferably is 0.85%, more preferably is 0.80%, further preferably is 0.70%, and more preferably is 0.60%.

Nb: 0 to 0.100%

Niobium (Nb) is an optional element, and need not be contained. In other words, the Nb content may be 0%. When contained, Nb forms carbides, nitrides or carbo-nitrides (hereinafter, referred to as "carbo-nitrides or the like") in the steel material, and increases the strength of the steel material. As long as the Nb content is more than 0%, these effects will be obtained to a certain extent. On the other hand, if the Nb content is more than 0.100%, even when the contents of the other elements are within the ranges of the present embodiment, the strength of the steel material will become too high, and the machinability of the steel material during steel piston production will decrease. Therefore, the Nb content is within the range of 0 to 0.100%. A preferable lower limit of the Nb content for effectively obtaining the aforementioned effects is 0.010%, more preferably is 0.015%, and further preferably is 0.020%. A preferable upper limit of the Nb content is 0.095%, more preferably is 0.090%, further preferably is 0.085%, more preferably is 0.080%, and further preferably is 0.070%.

[Regarding Formula (1) and Formula (2)]

The chemical composition of the upper member of the steel piston for use in a high-temperature usage environment of the present embodiment also satisfies Formula (1) and Formula (2).

$$0.42 \leq Mo+3V \leq 1.50 \quad (1)$$

$$V/Mo \geq 0.50 \quad (2)$$

where, a content (mass %) of a corresponding element is substituted for each symbol of an element in Formula (1) and Formula (2).

[Regarding Formula (1)]

It is defined that F1=Mo+3V. F1 is an index that indicates the ability to strengthen the high temperature strength by aging precipitation of Mo and V.

If F1 is less than 0.42, carbides containing Mo and/or V (Mo carbides, V carbides, and composite carbides containing Mo and V) cannot be subjected to aging precipitation sufficiently. Therefore, the desired high temperature strength and high temperature fatigue strength of the steel material are not obtained. On the other hand, if F1 is more than 1.50, the effect is saturated and the toughness of the steel material also decreases. If F1 is within the range of 0.42 to 1.50, that is, if F1 satisfies Formula (1), on the premise that Formula (2) is satisfied, carbides containing Mo and/or V will sufficiently precipitate, and the high temperature strength and high temperature fatigue strength of the steel material will increase. In addition, the toughness of the steel material will also increase. A preferable lower limit of F1 is 0.45, more preferably is 0.47, further preferably is 0.50, more preferably is 0.55, further preferably is 0.60, and more preferably is 0.62. A preferable upper limit of F1 is 1.48, more preferably is 1.46, further preferably is 1.42, more preferably is 1.40, further preferably is 1.36, more preferably is 1.34, and further preferably is 1.30.

[Regarding Formula (2)]

As described above, in the upper member of the steel piston for use in a high-temperature usage environment of the present embodiment, fine composite carbides containing Mo and V are subjected to aging precipitation in a large quantity in a temperature region from 500 to 600° C. By this means, in comparison to a case where the steel material contains Mo and does not contain V, or a case where the steel material contains V and does not contain Mo, a greater quantity of fine aging precipitates can be caused to precipitate in the upper member of the steel piston. As a result, the high temperature strength and the high temperature fatigue strength of the upper member of the steel piston are enhanced.

It is defined that F2=V/Mo. F2 is an index that indicates the ease with which composite carbides of Mo and V precipitate. If F2 is less than 0.50, composite carbides containing Mo and V do not sufficiently precipitate. Therefore, even if F1 satisfies Formula (1), sufficient high temperature strength will not be obtained. If F1 satisfies Formula (1) and F2 satisfies Formula (2), a decrease in strength in the high-temperature region of 500 to 600° C. can be suppressed, and excellent high temperature strength and high temperature fatigue strength are obtained. A preferable lower limit of F2 is 0.52, more preferably is 0.55, further preferably is 0.57, more preferably is 0.60, further preferably is 0.65, and more preferably is 0.70.

[Regarding Inclusions (Mn Sulfides and Oxides) Contained in Upper Member of Steel Piston]

In the upper member of the steel piston of the present embodiment, Mn sulfides and oxides in the steel at a cross section parallel to the central axis of the upper member (that is, the central axis of the steel piston) also satisfy the following conditions.

(A) The number of Mn sulfides containing 10.0 mass % or more of Mn and containing 10.0 mass % or more of S is 100.0 per $mm^2$ or less.

(B) Among the Mn sulfides, the number of coarse Mn sulfides having an equivalent circular diameter of 3.0 μm or more is within the range of 1.0 to 10.0 per $mm^2$.

(C) The number of oxides containing 10.0 mass % or more of oxygen is 15.0 per $mm^2$ or less.

In the present description, Mn sulfides and oxides are defined as follows.

Mn sulfides: inclusions containing 10.0 mass % or more of S and 10.0 mass % or more of Mn Oxides: inclusions containing 10.0 mass % or more of O Note that, in the present description, inclusions containing 10.0 mass % or more of Mn, 10.0 mass % or more of S, and 10.0 mass % or more of O (oxygen) are defined as "oxides". In other words, in the present description, the term "Mn sulfides" means inclusions that contain 10.0 mass % or more of Mn and 10.0 mass % or more of S, and in which the O content is less than 10.0%.

[Regarding Number of Mn Sulfides and Oxides (Aforementioned (A) and (C))]

In the upper member of the steel piston of the present embodiment, as described in (A) above, the number of Mn sulfides is 100.0 per $mm^2$ or less. In addition, as described in (C) above, the number of oxides is 15.0 per $mm^2$ or less.

In the upper member of the steel piston of the present embodiment, as described in the aforementioned (A) and (C), the number of Mn sulfides and oxides that account for a major portion of the inclusions contained in the upper member is made as small as possible. As described above, in some cases the steel piston is formed by friction joining or laser joining. In such a case, a HAZ will exist in the upper member of the steel piston. In some cases, the fatigue strength of a HAZ is lower than the fatigue strength of other regions. To secure the fatigue strength of a HAZ, the number of Mn sulfides and oxides that are inclusions is reduced.

[Regarding Number of Coarse Mn Sulfides (Aforementioned (B))]

In the present embodiment, in addition, as described in the above (B), among the Mn sulfides, the number of coarse Mn sulfides that have an equivalent circular diameter of 3.0 μm or more is within the range of 1.0 to 10.0 per $mm^2$.

As described above, inclusions are reduced in order to secure the fatigue strength of a HAZ. However, it is also necessary for the steel material that is used for the upper member of the steel piston to have machinability during the production process. Mn sulfides enhance the machinability of the steel material. However, unless the Mn sulfides are of a certain size or more, the Mn sulfides will not contribute to machinability. Therefore, in the present embodiment, on the premise that (A) and (C) are satisfied, as described in (B) above, the number of coarse Mn sulfides having an equivalent circular diameter of 3.0 μm or more is made to fall within the range of 1.0 to 10.0 per $mm^2$. The term "equivalent circular diameter" means the diameter of a circle in a case where the area of a sulfide at a cross section parallel to the axial direction (longitudinal direction) of the steel material for a steel piston is converted into a circle having the same area. In this case, while securing the number of coarse Mn sulfides required for the machinability of the steel material for the steel piston by means of (B), the total number of inclusions contained in the steel is kept as low as possible by means of (A) and (C) to thereby secure the fatigue strength of a HAZ of the steel piston.

A preferable upper limit of the number of Mn sulfides is 90.0 per $mm^2$, more preferably is 85.0 per $mm^2$, further preferably is 82.0 per $mm^2$, more preferably is 80.0 per $mm^2$, and further preferably is 78.0 per $mm^2$.

A preferable lower limit of the number of coarse Mn sulfides is 1.5 per $mm^2$, more preferably is 2.0 per $mm^2$, further preferably is 2.5 per $mm^2$, and more preferably is 3.0 per $mm^2$. A preferable upper limit of the number of coarse Mn sulfides is 9.0 per $mm^2$, more preferably is 8.5 per $mm^2$, further preferably is 8.0 per $mm^2$, and more preferably is 7.5 per $mm^2$.

A preferable upper limit of the number of oxides is 13.0 per $mm^2$, more preferably is 10.0 per $mm^2$, further preferably is 9.0 per $mm^2$, and more preferably is 8.0 per $mm^2$.

[Method for Measuring Mn Sulfides and Oxides]

The average aspect ratio of Mn sulfides, the number of Mn sulfides for which the aspect ratio is 3.0 or more, and the number of oxides in the steel can be measured by the following method.

Figure 3:
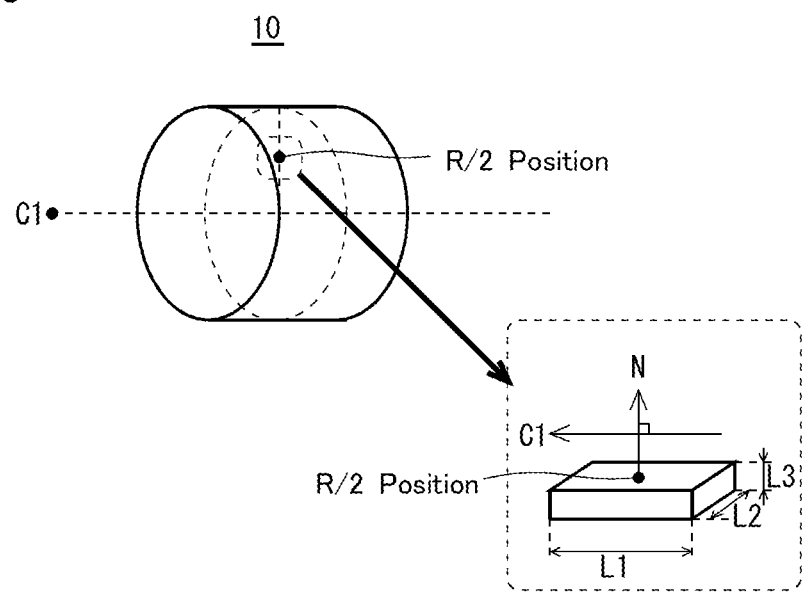
FIG. 3 is a schematic diagram for describing a position at which a sample is taken when measuring Mn sulfides and oxides in a steel piston according to the present embodiment.

A sample is taken from the upper member of the steel piston. As illustrated in FIG. 3, the sample is taken from an R/2 position (R represents the radius of the upper member) in the radial direction from a central axis line C1 of the upper member 10 (that is, the central axis of the steel piston). The size of the observation surface of the sample is represented by L1×L2, with L1 being 10 mm and L2 being 5 mm. In addition, a sample thickness L3 that is the thickness in a direction perpendicular to the observation surface is 5 mm. A normal N to the observation surface is perpendicular to the central axis line C1, and the R/2 position corresponds to the center position of the observation surface. In other words, the observation surface is parallel to the axial direction of the steel piston.

Using a scanning electron microscope (SEM), 20 visual fields (evaluation area per visual field is 100 μm×100 μm) on the observation surface of the sample taken are observed randomly at a magnification of ×1000.

In the respective visual fields, inclusions are identified. Each of the identified inclusions is subjected to point analysis using energy dispersive X-ray spectroscopy (EDX) to identify Mn sulfides and oxides. Specifically, in the elementary analysis results for the identified inclusions, in a case where the Mn content is 10.0 mass % or more and the S content is 10.0 mass % or more, the relevant inclusion is defined as an Mn sulfide. Further, in the elementary analysis results for the identified inclusions, in a case where the O content is 10.0 mass % or more, the relevant inclusion is defined as an oxide. Note that, an inclusion containing 10.0 mass % or more of Mn, 10.0 mass % or more of S, and 10.0 mass % or more of O is defined as an oxide.

Inclusions that are taken as the target of the aforementioned identification are inclusions having an equivalent circular diameter of 0.5 μm or more. Here, the term "equivalent circular diameter" means the diameter of a circle in a case where the area of each inclusion is converted into a circle having the same area.

If the inclusions have an equivalent circular diameter that is two times or more larger than the beam diameter of EDX, the accuracy of the elementary analysis will be increased. In the present embodiment, the beam diameter of the EDX used to identify inclusions is set to 0.2 μm. In this case, the accuracy of elementary analysis using EDX cannot be increased by inclusions that have an equivalent circular diameter that is less than 0.5 μm. In addition, inclusions that have an equivalent circular diameter of less than 0.5 μm have extremely small influence on strength. Therefore, in the present embodiment, Mn sulfides and oxides having an equivalent circular diameter of 0.5 μm or more are taken as the measurement target. Note that, the upper limit of the equivalent circular diameter of the inclusions is not particularly limited, and for example is 100 μm.

The number of Mn sulfides per unit area (number per $mm^2$) is determined based on the total number of Mn sulfides identified in the respective visual fields and the total area of the 20 visual fields. Further, the total number of coarse Mn sulfides having an equivalent circular diameter of 3.0 μm or more among the Mn sulfides identified in the respective visual fields is determined, and the number of coarse Mn sulfides per unit area (number per $mm^2$) is determined based on the total area of the 20 visual fields. Further, the number of oxides per unit area (number per $mm^2$) is determined based on the total number of oxides identified in the respective visual fields and the total area of the 20 visual fields.

[Regarding Lower Member 11]

The steel material constituting the lower member 11 may be the same as the steel material of the aforementioned upper member 10. In other words, the chemical composition of the lower member 11 may be the same as the chemical composition of the upper member 10. The steel material constituting the lower member 11 may also be different from the steel material of the upper member 10. In such a case, the chemical composition of the lower member 11 may be different from the chemical composition of the upper member 10. The lower member 11 may be an alloy material that is different from a steel material. Preferably, the lower member 11 is composed of a steel material. A well-known steel material suffices as the steel material constituting the lower member 11. As described above, during operation of the engine, the top land 16 of the upper member is exposed to the highest temperature. The temperature of the lower member 11 during operation of the engine is 300° C. or less. Therefore, a well-known steel material having a melting point higher than the melting point of aluminum suffices as the steel material constituting the lower member 11.

Note that, the lower member 11 may have the same composition as the upper member 10. In other words, the lower member 11 may have a chemical composition which consists of, in mass %, C: 0.15 to 0.30%, Si: 0.02 to 1.00%, Mn: 0.20 to 0.80%, P: 0.020% or less, S: 0.028% or less, Cr: 0.80 to 1.50%, Mo: 0.08 to 0.40%, V: 0.10 to 0.40%, Al: 0.005 to 0.060%, N: 0.0150% or less, O: 0.0030% or less, Cu: 0 to 0.50%, Ni: 0 to 1.00%, Nb: 0 to 0.100%, and the balance: Fe and impurities, and satisfies Formula (1) and Formula (2), wherein, at a cross section parallel to an axial direction of the steel piston in the lower member, a number of Mn sulfides containing 10.0 mass % or more of Mn and containing 10.0 mass % or more of S is 100.0 per $mm^2$ or less, among the Mn sulfides a number of coarse Mn sulfides having an equivalent circular diameter of 3.0 μm or more is within a range of 1.0 to 10.0 per $mm^2$, and a number of oxides containing 10.0 mass % or more of oxygen is 15.0 per $mm^2$ or less.

[Production Method]

An example of a method for producing the steel material constituting the upper member of the steel piston according to the present embodiment will now be described. In the present embodiment, a method for producing a steel bar as one example of a steel material (steel material for a steel piston) to be used for the upper member of the steel piston is described. However, the steel material for the steel piston of the present embodiment is not limited to a steel bar. The steel material for a steel piston of the present embodiment may also be, for example, a pipe.

One example of a method for producing the steel material for the steel piston includes a steel making process of refining and casting molten steel to produce a starting material (a cast piece or an ingot), and a hot working process of subjecting the starting material to hot working to produce the aforementioned steel material (steel material for a steel piston). Hereunder, each of these processes is described.

[Steel Making Process]

The steel making process includes a refining process and a casting process.

[Refining Process]

In the refining process, firstly, hot metal produced by a well-known method is subjected to refining (primary refining) using a converter. Molten steel tapped from the converter is subjected to secondary refining. In the secondary refining, alloying elements subjected to composition adjustment are added to thereby produce a molten steel satisfying the aforementioned chemical composition.

Specifically, Al is added to the molten steel tapped from the converter to perform a deoxidation treatment. After the deoxidation treatment, a deslagging treatment is performed. After the deslagging treatment, secondary refining is performed. In the secondary refining, composite refining is performed. First, secondary refining that uses an LF (ladle furnace) is performed. In addition, an RH (Ruhrstahl-Hausen) vacuum degassing treatment is performed. Thereafter, final adjustment of alloy elements is performed.

In this case, the basicity of the slag (=CaO in slag/$SiO_2$ in slag (mass ratio)) in the LF is adjusted to within the following range.

Slag basicity: 2.5 to 4.5

In the present embodiment, in order to satisfy the requirements for inclusions described in (A) to (C) above, the basicity of the slag in the LF is adjusted to within the range of 2.5 to 4.5. In a case where the slag basicity is within the range of 2.5 to 4.5, Ca contained in the slag dissolves in the molten steel, and Mn sulfides and oxides are formed. By means of this slight amount of Ca that dissolved in the molten steel, coarsening of Mn sulfides and oxides is suppressed and the number of these inclusions (Mn sulfides and oxides) is also kept to a low number. In addition, the number of coarse Mn sulfides satisfies the aforementioned (B).

If the slag basicity in the LF is less than 2.5, the number of Mn sulfides will be more than 100.0 per $mm^2$ and/or the number of oxides will be more than 15.0 per $mm^2$. Alternatively, the number of coarse Mn sulfides will be more than 10.0 per $mm^2$.

On the other hand, if the slag basicity in the LF is more than 4.5, because formation of coarse Mn sulfides will be suppressed, the number of coarse Mn sulfides will be less than 1.0 per $mm^2$.

A preferable lower limit of the slag basicity in the LF is 2.6, and more preferably is 2.7. A preferable upper limit of the slag basicity in the LF is 4.4, and more preferably is 4.3.

Note that, the molten steel temperature in the LF is, for example, 1500 to 1600° C. After performing the aforementioned secondary refining, adjustment of the components of the molten steel is performed by a well-known method.

[Casting Process]

In the casting process, a starting material (a cast piece or an ingot) is produced using the molten steel produced by the above refining process. Specifically, a cast piece is produced by a continuous casting process using the molten steel. Alternatively, an ingot may be produced by an ingot-making process using the molten steel.

[Hot Working Process]

In the hot working process, the produced starting material is subjected to hot working to produce a steel material for a steel piston. In the hot working process, hot working is usually performed once or a plurality of times. In the case of performing hot working a plurality of times, the initial hot working (rough working process) is, for example, blooming or hot forging, and the next hot working (finishing process) is, for example, finish rolling using a continuous mill. In the continuous mill, a horizontal stand having a pair of horizontal rolls, and a vertical stand having a pair of vertical rolls are alternately arranged in a row.

In a case where the hot working process includes a rough working process and a finishing process, the heating temperature of the starting material during the rough working process is set to within the range of 1000 to 1300° C. Further, when using a continuous mill in the finishing process, the temperature of the starting material on the exit side of the final stand that rolls the starting material is defined as the rolling finishing temperature. In this case, the rolling finishing temperature is set within the range of 850 to 1100° C. The steel material after the finishing process is cooled until becoming room temperature. The cooling method is not particularly limited. The cooling method is, for example, allowing the steel material to cool in the air.

Note that, the microstructure of the steel material for a steel piston of the present embodiment is not particularly limited. In a method for producing a steel piston that is described later, the steel material for a steel piston of the present embodiment is heated to the $A_{c3}$ transformation point or higher prior to hot forging. Therefore, the microstructure of the steel material for a steel piston of the present embodiment is not particularly limited. For example, at an R/2 position in a cross section perpendicular to the axial direction (longitudinal direction) of the steel material for a steel piston, the total area fraction of ferrite and pearlite is 80% or more, and the balance is bainite or martensite. However, the microstructure of the steel material for a steel piston of the present embodiment is not particularly limited to the aforementioned microstructure.

A steel material for a steel piston that is to be used for the upper member of the piston for use in a high-temperature usage environment of the present embodiment can be produced by the above processes. Note that, as described above, the lower member may also be produced using the aforementioned steel material for a steel piston.

[Method for Producing Steel Piston for Use in High-Temperature Usage Environment]

An example of a method for producing a steel piston using the steel material of the present embodiment that is described above will now be described.

For example, the following two patterns are available with respect to a method for producing the steel piston of the present embodiment.

Pattern 1: hot forging process→thermal refining treatment process→joining process→machining process Pattern 2: hot forging process→joining process→thermal refining treatment process→machining process According to pattern 1, the steel piston is produced as follows. First, the aforementioned steel material for a steel piston is subjected to hot forging to produce an upper member that is an intermediate product (intermediate upper member). Further, the aforementioned steel material for a steel piston, or another steel material having a chemical composition that is different from the aforementioned steel material for a steel piston, or an alloy that is other than a steel material is subjected to hot forging to produce a lower member that is an intermediate product (intermediate lower member) (hot forging process). Although in the following description an example is described in which the lower member is produced using a steel material, in a case where the lower member is produced using an alloy that is other than a steel material also, it is possible to produce the lower member by the same production method.

Note that, most preferably, the lower member and the upper member are produced using a steel material for a steel piston. In this case, the steel material for a steel piston that is used for the lower member need not be completely identical to the steel material for a steel piston that is used for the upper member. As long as the steel material for a steel piston that is used for the lower member has a chemical composition which consists of, in mass %, C: 0.15 to 0.30%, Si: 0.02 to 1.00%, Mn: 0.20 to 0.80%, P: 0.020% or less, S: 0.028% or less, Cr: 0.80 to 1.50%, Mo: 0.08 to 0.40%, V: 0.10 to 0.40%, Al: 0.005 to 0.060%, N: 0.0150% or less, O: 0.0030% or less, Cu: 0 to 0.50%, Ni: 0 to 1.00%, Nb: 0 to 0.100%, and the balance: Fe and impurities, and satisfies Formula (1) and Formula (2), and in which, at a cross section parallel to the axial direction of the steel piston in the lower member, a number of Mn sulfides containing 10.0 mass % or more of Mn and containing 10.0 mass % or more of S is 100.0 per mm$^2$ or less, among the Mn sulfides a number of coarse Mn sulfides having an equivalent circular diameter of 3.0 μm or more is within a range of 1.0 to 10.0 per mm$^2$, and a number of oxides containing 10.0 mass % or more of oxygen is 15.0 per mm$^2$ or less, the content of each element and the number of inclusions need not completely match the content of each element and the number of inclusions of the upper member.

The heating temperature of the steel material during hot forging of the intermediate upper member and the intermediate lower member is, for example, 1100 to 1250° C. Here, the term "heating temperature" means the furnace temperature of the heating furnace.

The thus-produced intermediate upper member and intermediate lower member are subjected to a thermal refining treatment (quenching and tempering) (thermal refining treatment process). The quenching is performed at a well-known quenching temperature ($A_{c3}$ transformation point or higher), followed by rapidly cooling. The rapidly cooling is, for example, water cooling or oil cooling. The tempering is also performed at a well-known tempering temperature ($A_{C1}$ transformation point or lower).

After undergoing the thermal refining treatment process, the intermediate upper member and the intermediate lower member are joined together by friction joining or laser joining to produce a joined product (joining process). Specifically, the central axis of the intermediate upper member and the central axis of the intermediate lower member match. The central axis of the intermediate upper member is arranged coaxially with the central axis of the intermediate lower member. The lower end face of the intermediate upper member and the upper end face of the intermediate lower member are butted together, and friction joining or laser joining is performed.

In a case where the lower end face of the intermediate upper member and the upper end face of the intermediate lower member are butted together and well-known friction joining is to be performed, for example, the friction pressure is set within the range of 50 to 200 MPa and the friction time is set within the range of 2 to 20 seconds. The upset pressure (pressure applied from the two ends of the intermediate upper member and the intermediate lower member to the joint) is set within the range of 100 to 300 MPa. The upset time is set within the range of 2 to 20 seconds. However, the friction joining conditions are not limited to these conditions.

The joined product is subjected to machining such as cutting to produce a steel piston as the end product (machining process).

According to pattern 2, the steel piston is produced as follows. The steel material is subjected to hot forging to produce an intermediate upper member and an intermediate lower member that are intermediate products (hot forging process). The conditions of the hot forging process are the same as in pattern 1. The intermediate upper member and the intermediate lower member are subjected to friction joining or laser joining to produce a joined product (joining process). The conditions of the joining process are the same as in pattern 1. The joined product is subjected to a thermal refining treatment (quenching and tempering) (thermal refining treatment process). The conditions of the quenching and tempering are the same as in pattern 1. After undergoing the thermal refining treatment, the joined product is subjected to machining such as cutting to produce a piston that is the end product.

[Microstructure of Upper Member 10 of Steel Piston]

The microstructure of the upper member 10 of the steel piston is a structure that is principally composed of bainite. Here, the phrase "structure that is principally composed of bainite" means a structure in which the total area fraction of ferrite and pearlite is 10.0% or more and the balance is bainite. A lower limit of the area fraction of bainite is 70.0%, preferably is 80.0%, and more preferably is 85.0%. An upper limit of the total area fraction of ferrite and pearlite is 30.0%, more preferably is 25.0%, further preferably is 20.0% and more preferably is 15.0%. Note that, in the microstructure of the steel material for a steel piston, regions other than bainite, ferrite and pearlite are, for example, retained austenite, precipitates (including cementite) and inclusions. The area fraction of retained austenite is small enough to be negligible.

[Method for Measuring Bainite Area Fraction]

The total area fraction (%) of ferrite and pearlite and the area fraction (%) of bainite in the microstructure of the upper member 10 of the steel piston of the present embodiment are measured by the following method. A sample is taken from an R/2 position of the upper member 10. After mirror-polishing the surface (observation surface) of the sample taken, the observation surface is subjected to etching using 2% nitric acid-alcohol (nital etching reagent). The etched observation surface is observed using an optical microscope having a magnification of ×500, and photographic images of an arbitrary 20 visual fields are generated. The size of each visual field is 100 μm×100 μm.

In each visual field, the contrast differs for each of the respective phases of bainite, ferrite, pearlite and the like. Accordingly, the respective phases are identified based on the contrast. The gross area (μm$^2$) of ferrite and the gross area (μm$^2$) of pearlite among the identified phases are determined for each visual field. The proportion of the total area of the gross area of ferrite and gross area of pearlite in all of the visual fields relative to the total area of all the visual fields is defined as the total area fraction (%) of ferrite and pearlite. The area fraction (%) of bainite is determined by the following method using the total area fraction of ferrite and pearlite.

Bainite area fraction=100.0−total area fraction of ferrite and pearlite

The total area fraction (%) of ferrite and pearlite is a value obtained by rounding off to the first decimal place.

Note that, in the case of producing the lower member 11 using the aforementioned steel material for a steel piston similarly to the upper member 10, the microstructure of the lower member 11 is also a structure that is principally composed of bainite. Here, the phrase "structure that is principally composed of bainite" means a structure in which the total area fraction of ferrite and pearlite is 10.0% or more and the balance is bainite. A lower limit of the area fraction of bainite is 70.0%, preferably is 80.0%, and more preferably is 85.0%. An upper limit of the total area fraction of ferrite and pearlite is 30.0%, more preferably is 25.0%, further preferably is 20.0% and more preferably is 15.0%. Note that, in the microstructure of the steel material for a steel piston, regions other than bainite, ferrite and pearlite are, for example, retained austenite, precipitates (including cementite) and inclusions. The area fraction of retained austenite is small enough to be negligible.

Example 1

Molten steels having the chemical compositions shown in Table 1 were produced.

TABLE 1

| Test Number | \multicolumn{16}{c}{Chemical Composition (unit is mass %; balance is Fe and impurities)} |
|---|---|---|---|---|---|---|---|---|---|---|---|---|---|---|---|---|---|
| | C | Si | Mn | P | S | Cr | Mo | V | Al | N | O | Cu | Ni | Nb | Ca | F1 | F2 |
| 1 | 0.19 | 0.61 | 0.63 | 0.008 | 0.018 | 1.18 | 0.24 | 0.31 | 0.033 | 0.0052 | 0.0013 | — | — | — | 0.0002 | 1.17 | 1.29 |
| 2 | 0.22 | 0.32 | 0.71 | 0.011 | 0.008 | 1.20 | 0.28 | 0.27 | 0.038 | 0.0064 | 0.0012 | — | — | — | 0.0001 | 1.09 | 0.96 |
| 3 | 0.17 | 0.76 | 0.32 | 0.009 | 0.012 | 1.42 | 0.22 | 0.34 | 0.029 | 0.0081 | 0.0018 | — | — | — | 0.0002 | 1.29 | 1.55 |
| 4 | 0.21 | 0.28 | 0.65 | 0.008 | 0.002 | 1.22 | 0.16 | 0.12 | 0.032 | 0.0051 | 0.0011 | — | — | — | 0.0004 | 0.52 | 0.75 |
| 5 | 0.19 | 0.46 | 0.72 | 0.009 | 0.022 | 1.48 | 0.33 | 0.38 | 0.018 | 0.0076 | 0.0021 | — | — | — | 0.0001 | 1.47 | 1.15 |
| 6 | 0.16 | 0.94 | 0.78 | 0.014 | 0.026 | 1.39 | 0.28 | 0.15 | 0.045 | 0.0147 | 0.0028 | 0.12 | — | — | 0.0002 | 0.73 | 0.54 |
| 7 | 0.29 | 0.08 | 0.23 | 0.009 | 0.003 | 0.92 | 0.18 | 0.11 | 0.012 | 0.0122 | 0.0009 | — | 0.16 | — | 0.0002 | 0.51 | 0.61 |
| 8 | 0.22 | 0.29 | 0.75 | 0.011 | 0.016 | 1.22 | 0.24 | 0.32 | 0.007 | 0.0046 | 0.0011 | — | — | 0.027 | 0.0004 | 1.20 | 1.33 |
| 9 | 0.24 | 0.34 | 0.77 | 0.012 | 0.014 | 1.32 | 0.27 | 0.22 | 0.023 | 0.0078 | 0.0009 | 0.15 | 0.21 | — | 0.0003 | 0.93 | 0.81 |
| 10 | 0.11 | 0.42 | 0.78 | 0.006 | 0.022 | 1.23 | 0.21 | 0.26 | 0.042 | 0.0081 | 0.0009 | — | — | — | 0.0002 | 0.99 | 1.24 |
| 11 | 0.39 | 0.08 | 0.64 | 0.009 | 0.003 | 1.19 | 0.24 | 0.31 | 0.032 | 0.0041 | 0.0011 | — | — | — | 0.0003 | 1.17 | 1.29 |
| 12 | 0.18 | 0.45 | 0.72 | 0.012 | 0.021 | 0.85 | 0.06 | 0.16 | 0.036 | 0.0083 | 0.0012 | — | — | — | 0.0002 | 0.54 | 2.67 |
| 13 | 0.25 | 0.67 | 0.77 | 0.009 | 0.022 | 1.21 | 0.45 | 0.26 | 0.044 | 0.0085 | 0.0011 | — | — | — | 0.0002 | 1.23 | 0.58 |
| 14 | 0.26 | 0.33 | 0.79 | 0.014 | 0.019 | 1.09 | 0.19 | 0.08 | 0.036 | 0.0079 | 0.0012 | — | — | — | 0.0003 | 0.43 | 0.42 |
| 15 | 0.19 | 0.51 | 0.61 | 0.009 | 0.017 | 1.19 | 0.21 | 0.42 | 0.028 | 0.0064 | 0.0009 | — | — | — | 0.0003 | 1.47 | 2.00 |
| 16 | 0.25 | 0.45 | 0.62 | 0.010 | 0.022 | 1.31 | 0.09 | 0.10 | 0.034 | 0.0083 | 0.0011 | — | — | — | 0.0002 | 0.39 | 1.11 |
| 17 | 0.18 | 0.32 | 0.59 | 0.008 | 0.006 | 1.22 | 0.38 | 0.39 | 0.041 | 0.0056 | 0.0018 | — | — | — | 0.0003 | 1.55 | 1.03 |
| 18 | 0.21 | 0.81 | 0.62 | 0.011 | 0.008 | 1.21 | 0.32 | 0.12 | 0.031 | 0.0058 | 0.0011 | — | — | — | 0.0002 | 0.68 | 0.38 |
| 19 | 0.24 | 0.22 | 0.76 | 0.006 | 0.009 | 1.10 | 0.34 | 0.10 | 0.032 | 0.0061 | 0.0011 | — | — | — | 0.0002 | 0.64 | 0.29 |
| 20 | 0.19 | 0.58 | 0.62 | 0.009 | 0.027 | 1.19 | 0.25 | 0.29 | 0.034 | 0.0062 | 0.0013 | — | — | — | 0.0001 | 1.12 | 1.16 |
| 21 | 0.16 | 0.32 | 0.65 | 0.011 | 0.022 | 1.23 | 0.24 | 0.31 | 0.042 | 0.0071 | 0.0009 | — | — | — | 0.0001 | 1.17 | 1.29 |
| 22 | 0.22 | 0.36 | 0.48 | 0.012 | 0.015 | 1.18 | 0.18 | 0.35 | 0.051 | 0.0078 | 0.0021 | — | — | — | 0.0004 | 1.23 | 1.94 |
| 23 | 0.26 | 0.33 | 0.63 | 0.007 | 0.003 | 1.12 | 0.17 | 0.31 | 0.031 | 0.0048 | 0.0017 | — | — | — | 0.0004 | 1.10 | 1.82 |
| 24 | 0.41 | 0.20 | 0.78 | 0.006 | 0.006 | 1.10 | 0.16 | — | 0.032 | 0.0051 | 0.0011 | — | — | — | 0.0004 | 0.16 | 0 |
| 25 | 0.21 | 0.49 | 0.62 | 0.009 | 0.009 | 1.21 | 0.23 | 0.30 | 0.021 | 0.0075 | 0.0012 | — | — | — | 0.0003 | 1.13 | 1.30 |

The symbol "—" in Table 1 means that the corresponding element content was less than the detection limit. Further, F1 values are listed in an "F1" column, and F2 values are listed in an "F2" column. The molten steels having the chemical compositions of the respective test numbers were subjected to primary refining using a converter by a well-known method. In addition, after the molten steel was tapped from the converter, Al was added to the molten steel to perform a well-known deoxidation treatment. Further, after the deoxidation treatment, a well-known deslagging treatment was performed. After the deslagging treatment, secondary refining was performed. First, secondary refining using an LF was performed. Thereafter, a well-known RH vacuum degassing treatment was performed. After the RH treatment, final adjustment of other alloy elements was performed. Note that, for the molten steel of each test number, the basicity of the slag in the LF was as shown in Table 2. The molten steel temperature in the LF was within the range of 1500 to 1600° C.

TABLE 2

| Test Number | Basicity | Number of MnS (per mm$^2$) | Number of Coarse MnS (per mm$^2$) | Number of Oxides (per mm$^2$) | Micro-structure | Machinability Evaluation (%) | High Temperature Fatigue Strength (MPa) | Joint High Temperature Fatigue Strength (MPa) | Impact Value (J/cm$^2$) |
|---|---|---|---|---|---|---|---|---|---|
| 1 | 3.1 | 82.0 | 6.0 | 8.0 | B | 100 | 440 | 380 | 74 |
| 2 | 2.6 | 69.0 | 5.0 | 7.0 | B | 100 | 430 | 375 | 86 |
| 3 | 2.9 | 75.0 | 7.0 | 9.0 | B | 100 | 450 | 380 | 78 |
| 4 | 2.8 | 62.0 | 5.0 | 6.0 | B | 100 | 420 | 370 | 91 |
| 5 | 4.1 | 77.0 | 6.0 | 9.0 | B | 100 | 460 | 380 | 70 |
| 6 | 2.9 | 81.0 | 9.0 | 11.0 | B | 90 | 430 | 370 | 94 |
| 7 | 3.3 | 63.0 | 7.0 | 6.0 | B | 90 | 420 | 360 | 92 |

TABLE 2-continued

| Test Number | Basicity | Number of MnS (per mm²) | Number of Coarse MnS (per mm²) | Number of Oxides (per mm²) | Micro-structure | Machinability Evaluation (%) | High Temperature Fatigue Strength (MPa) | Joint High Temperature Fatigue Strength (MPa) | Impact Value (J/cm²) |
|---|---|---|---|---|---|---|---|---|---|
| 8 | 4.4 | 76.0 | 7.0 | 7.0 | B | 100 | 450 | 370 | 80 |
| 9 | 2.8 | 75.0 | 6.0 | 6.0 | B | 100 | 440 | 370 | 82 |
| 10 | 3.4 | 88.0 | 6.0 | 7.0 | B | 95 | 390 | 350 | 98 |
| 11 | 2.9 | 72.0 | 4.0 | 8.0 | B | 135 | 470 | 380 | 30 |
| 12 | 3.9 | 89.0 | 5.0 | 7.0 | B | 90 | 400 | 360 | 98 |
| 13 | 2.8 | 81.0 | 7.0 | 6.0 | B | 100 | 450 | 380 | 61 |
| 14 | 3.1 | 82.0 | 6.0 | 7.0 | B | 95 | 390 | 360 | 96 |
| 15 | 3.0 | 79.0 | 7.0 | 6.0 | B | 100 | 470 | 380 | 63 |
| 16 | 2.9 | 83.0 | 8.0 | 7.0 | B | 90 | 405 | 360 | 94 |
| 17 | 3.3 | 69.0 | 5.0 | 9.0 | B | 100 | 440 | 370 | 65 |
| 18 | 3.7 | 73.0 | 6.0 | 8.0 | B | 100 | 390 | 360 | 92 |
| 19 | 2.8 | 74.0 | 5.0 | 7.0 | B | 100 | 400 | 360 | 90 |
| 20 | 1.8 | 112.0 | 14.0 | 14.0 | B | 90 | 390 | 330 | 86 |
| 21 | 2.3 | 106.0 | 10.0 | 20.0 | B | 90 | 385 | 320 | 88 |
| 22 | 4.8 | 79.0 | 0.0 | 5.0 | B | 115 | 450 | 380 | 83 |
| 23 | 5.1 | 68.0 | 0.0 | 7.0 | B | 120 | 440 | 370 | 82 |
| 24 | 2.9 | 76.0 | 7.0 | 9.0 | B | 100 | 350 | 320 | 85 |
| 25 | 3.0 | 72.0 | 5.0 | 7.0 | B | 100 | 430 | 370 | 81 |

Cast pieces were produced by a continuous casting process using the respective molten steels after the secondary refining. Each produced cast piece was subjected to blooming to produce a billet. The heating temperature before blooming of the cast piece of each test number was within the range of 1000 to 1200° C. In addition, after blooming, each billet was subjected to finish rolling using a continuous mill. The rolling finishing temperature of each test number was within the range of 850 to 1100° C. A steel material to be used for the upper member or the upper member and the lower member of a steel piston for use in a high-temperature usage environment that was a steel bar with a diameter of 40 mm was produced by the above processes.

[Evaluation Tests]

The following evaluation tests were conducted using the thus-produced steel material (steel bar) of each test number.

[Preparation of Test Specimen for Inclusions and Microstructure Observation]

Test specimens were prepared by performing production of quasi steel piston members that assumed a member (upper member or lower member) of a steel piston using the steel material of each test number. Specifically, the steel bar with a diameter of 40 mm of each test number was heated for 30 minutes at a heating temperature of 1200° C. After being heated, the steel bar was subjected to hot forging to produce a round bar with a diameter of 30 mm. The finishing temperature in the hot forging was 950° C. or more for each test number. The produced round bar was subjected to a thermal refining treatment. Specifically, the round bar was heated for one hour at a heating temperature of 950° C., and thereafter was immersed in an oil bath at an oil temperature of 80° C. and quenched. After quenching, the round bar was subjected to tempering. In the tempering, the round bar after quenching was held for one hour at a heating temperature of 600° C., and thereafter was allowed to cool in the atmosphere. After undergoing the aforementioned thermal refining treatment (quenching and tempering), the round bar (simulated material of intermediate upper member) was subjected to machining to prepare a test specimen having a diameter of 20 mm and a length of 40 mm. The central axis of the test specimen approximately matched the central axis of the round bar after the thermal refining treatment.

[Mn Sulfides and Oxides Measurement Test]

The number of Mn sulfides (number per mm²), the number of coarse Mn sulfides (number per mm²) having an equivalent circular diameter of 3.0 μm or more, and the number of oxides (number per mm²) of the test specimen of each test number described above were measured by the following method.

A sample was taken from the test specimen of each test number. As illustrated in FIG. 3, a sample was taken from an R/2 position ("R" represents the radius of the test specimen) in the radial direction from a central axis line C1 of the steel bar. The size of the observation surface of the sample was L1×L2, with L1 being set to 10 mm and L2 being set to 5 mm. In addition, a sample thickness L3 that was the thickness in a direction perpendicular to the observation surface was set to 5 mm. A normal N to the observation surface was perpendicular to the central axis line C1, and the R/2 position corresponded to the center position of the observation surface.

Using an SEM, 20 visual fields (evaluation area per visual field was 100 μm×100 μm) on the observation surface of each sample taken were observed randomly at a magnification of ×1000. Inclusions were identified in the respective visual fields. Each of the identified inclusions was subjected to point analysis using energy dispersive X-ray spectroscopy (EDX), and Mn sulfides and oxides were identified. Specifically, in the elementary analysis results for the identified inclusions, in a case where the Mn content was 10.0 mass % or more and the S content was 10.0 mass % or more, the relevant inclusion was defined as an Mn sulfide. Further, in the elementary analysis results for the identified inclusions, in a case where the O content was 10.0 mass % or more, the relevant inclusion was defined as an oxide. Note that, an inclusion containing 10.0 mass % or more of Mn, 10.0 mass % or more of S, and 10.0 mass % or more of O was defined as an oxide.

The inclusions taken as the target of the identification were inclusions having an equivalent circular diameter of 0.5 μm or more. Further, the beam diameter of the EDX used to identify the inclusions was set to 0.2 μm. The number of Mn sulfides per unit area (number per mm²) was determined based on the total number of Mn sulfides identified in the 20 visual fields and the total area of the 20 visual fields. The total number of coarse Mn sulfides having an equivalent circular diameter of 3.0 µm or more among the Mn sulfides identified in the 20 visual fields was determined. Further, the number of coarse Mn sulfides per unit area (number per mm$^2$) was determined based on the total number of coarse Mn sulfides and the total area of the 20 visual fields. Furthermore, the number of oxides per unit area (number per mm$^2$) was determined based on the total number of oxides identified in the 20 visual fields and the total area of the 20 visual fields. The number of Mn sulfides per unit area (number per mm$^2$), the number of coarse Mn sulfides per unit area (number per mmn), and the number of oxides per unit area (number per mm$^2$) obtained are shown in Table 2.

[Bainite Area Fraction Measurement Test]

Using the aforementioned test specimen (simulating the upper member or lower member of a steel piston) of each test number, the total area fraction (%) of ferrite and pearlite and the area fraction (%) of bainite in the microstructure were measured by the following method. A sample was taken from the R/2 position of the test specimen. After mirror-polishing the surface (observation surface) of the sample taken, the observation surface was subjected to etching using 2% nitric acid-alcohol (nital etching reagent). The etched observation surface was observed using an optical microscope having a magnification of ×500, and photographic images of an arbitrary 20 visual fields were generated. The size of each visual field was set to 100 µm×100 µm. In each visual field, the contrast differs for each of the respective phases of bainite, ferrite, pearlite and the like. Accordingly, the respective phases were identified based on the contrast. The gross area (µm$^2$) of ferrite and the gross area (µm$^2$) of pearlite among the identified phases were determined for each visual field. The proportion of the total area of the gross area of ferrite and gross area of pearlite in all of the visual fields relative to the total area of all the visual fields was defined as the total area fraction (%) of ferrite and pearlite. The area fraction (%) of bainite was determined by the following method using the total area fraction of ferrite and pearlite.

Bainite area fraction=100.0−total area fraction of ferrite and pearlite

Note that, a value obtained by rounding off to the first decimal place was taken as the total area fraction (%) of ferrite and pearlite. If the obtained bainite area fraction was 70.0% or more, it was determined that the microstructure of the test specimen was a structure principally composed of bainite. The character "B" in the "microstructure" column in Table 2 indicates that the bainite area fraction was 70.0% or more.

[Machinability Test]

A cutting test was conducted on the steel material of each test number by the following method, and the machinability was evaluated.

First, a process for producing a simulated steel piston was performed with respect to the steel material of each test number to thereby prepare cutting test specimens (corresponding to an upper member or a lower member). Specifically, a steel bar with a diameter of 40 mm of each test number was heated for 30 minutes at a heating temperature of 1200° C. After being heated, the steel bar was subjected to hot forging to produce a round bar with a diameter of 30 mm. The finishing temperature in the hot forging was 950° C. or more for each test number.

The produced round bar was subjected to a thermal refining treatment. Specifically, the round bar was heated for one hour at a heating temperature of 950° C., and thereafter was immersed in an oil bath at an oil temperature of 80° C. and quenched. After quenching, the round bar was subjected to tempering. In the tempering, the round bar after quenching was held for one hour at a heating temperature of 600° C., and thereafter was allowed to cool in the atmosphere.

After undergoing the aforementioned thermal refining treatment (quenching and tempering), the round bar (simulated material of intermediate upper member) was subjected to machining to prepare a cutting test specimen having a diameter of 20 mm and a length of 40 mm. The central axis of the cutting test specimen approximately matched the central axis of the round bar after the thermal refining treatment.

A cutting test was conducted under the following conditions using the prepared cutting test specimens. With respect to the chip, an uncoated chip in which the base metal material was P20 grade carbide was used. The cutting conditions were as follows.

Circumferential speed: 200 m/min
Feed rate: 0.30 mm/rev
Depth of cut: 1.5 mm, and water-soluble cutting oil was used The average width of flank wear VB (µm) was measured as the amount of wear of the main cutting blade of the flank of the chip after a cutting time of 10 minutes passed. The average width of flank wear VB of the chip in Test Number 24 was adopted as a reference value. If the average width of flank wear VB of the chip of the respective test numbers was 100% or less relative to the reference value, it was determined that excellent machinability was obtained. Note that, the material quality of the steel material of Test Number 24 was equivalent to 42CrMo4 of the ISO standard, and the Vickers hardness Hv (test force: 9.8 N) in accordance with JIS Z 2244 (2009) was 300.

[High Temperature Fatigue Strength Test]

A high-temperature Ono type rotating bending fatigue test was conducted on the steel material of each test number, and the fatigue strength was evaluated. Specifically, first a process for producing a simulated steel piston was performed with respect to the steel material of each test number to thereby prepare high-temperature Ono type rotating bending fatigue test specimens (corresponding to an upper member or a lower member).

Specifically, a steel bar with a diameter of 40 mm of each test number was heated for 30 minutes at a heating temperature of 1200° C. After being heated, the steel bar was subjected to hot forging to produce a round bar with a diameter of 30 mm. The finishing temperature in the hot forging was 950° C. or more for each test number.

After the hot forging, the round bar was subjected to a thermal refining treatment. Specifically, the round bar was heated for one hour at a heating temperature of 950° C., and thereafter was immersed in an oil bath at an oil temperature of 80° C. and quenched. After quenching, the round bar was subjected to tempering. In the tempering, the round bar after quenching was held for one hour at a heating temperature of 600° C., and thereafter was allowed to cool in the atmosphere.

A high-temperature Ono type rotating bending fatigue test specimen was prepared from a central part of a cross section perpendicular to the axial direction (longitudinal direction) of the round bar after thermal refining treatment. The central axis of the high-temperature Ono type rotating bending fatigue test specimen approximately matched the central axis of the round bar after the thermal refining treatment. The diameter of a parallel portion of the high-temperature Ono type rotating bending fatigue test specimen was 8 mm, and the length of the parallel portion was 15.0 mm. A test specimen (high-temperature Ono type rotating bending fatigue test specimen) simulating an upper member of a steel piston was prepared by the above process.

A high-temperature Ono type rotating bending fatigue test was conducted under the following conditions using the thus-prepared high-temperature Ono type rotating bending fatigue test specimens. The evaluation temperature was set to 500° C. The test specimen was mounted in a testing machine inside a heating furnace, and thereafter increasing of the temperature of the heating furnace was started while rotating at 2500 rpm. After the indicated value of the furnace thermometer of the heating furnace reached 500° C., the test specimen was held for 30 minutes at 500° C. After being held for 30 minutes, a load was applied to start the fatigue test. The stress ratio was set to −1, and the maximum number of repetitions was set to $1\times10^7$ times. The endurance stress at the maximum number of repetitions ($1\times10^7$ times) was defined as the fatigue strength (MPa). The obtained fatigue strength (MPa) for each test number is shown in Table 2. If the fatigue strength was 420 MPa or more, it was determined that excellent high temperature fatigue strength was obtained.

[Joint High Temperature Fatigue Strength Test]

For each test number, the high temperature fatigue strength of a joint of the round bar joined by friction joining was evaluated by the following method.

First, a process for producing a simulated steel piston was performed with respect to the steel material of each test number to thereby prepare joined round bar specimens (corresponding to an upper member and a lower member). Specifically, a steel bar with a diameter of 40 mm of each test number was heated for 30 minutes at a heating temperature of 1200° C. After being heated, the steel bar was subjected to hot forging to produce a round bar with a diameter of 30 mm. The finishing temperature in the hot forging was 950° C. or more for each test number.

After the hot forging, the round bar was subjected to a thermal refining treatment. Specifically, the round bar was heated for one hour at a heating temperature of 950° C., and thereafter was immersed in an oil bath at an oil temperature of 80° C. and quenched. After quenching, the round bar was subjected to tempering. In the tempering, the round bar after quenching was held for one hour at a heating temperature of 600° C., and thereafter was allowed to cool in the atmosphere.

Machining was performed with respect to the axial direction (longitudinal direction) of each round bar after the thermal refining treatment to prepare two rough round bar specimens having a diameter of 20 mm and a length of 150 mm for each test number (corresponding to simulated material of intermediate upper member and simulated material of intermediate lower member). The central axis of each of the two rough specimens prepared approximately matched the central axis of the round bar after the thermal refining treatment. The ends of the two rough specimens were butted together, and friction joining was performed to prepare a joined round bar specimen. In the friction joining, the friction pressure was set to 100 MPa and the friction time was set to 5 seconds. The upset pressure (applied pressure from the two ends of the rough specimens to the joint) was set to 200 MPa, and the upset time was set to 5 seconds. The rotation speed during friction joining was set to 2000 rpm, and the burn-off length was set within the range of 5 to 12 mm.

Machining (lathe turning) was performed to prepare a high-temperature Ono type rotating bending fatigue test specimen from a central part of a cross section perpendicular to the longitudinal direction of the joined round bar specimen. The central axis of the high-temperature Ono type rotating bending fatigue test specimen matched the central axis of the joined round bar specimen. The diameter of a parallel portion of the high-temperature Ono type rotating bending fatigue test specimen was 8 mm, and the length of the parallel portion was 15.0 mm. The center position of the parallel portion in the axial direction corresponded to the joining position.

A high-temperature Ono type rotating bending fatigue test was conducted under the following conditions using the thus-prepared high-temperature Ono type rotating bending fatigue test specimens. The evaluation temperature was set to 500° C. The test specimen was mounted in a testing machine inside a heating furnace, and thereafter increasing of the temperature of the heating furnace was started while rotating at 2500 rpm. After the indicated value of the furnace thermometer of the heating furnace reached 500° C., the test specimen was held for 30 minutes at 500° C. After being held for 30 minutes, a load was applied to start the fatigue test. The stress ratio was set to −1, and the maximum number of repetitions was set to $1\times10^7$ times. The endurance stress at the maximum number of repetitions ($1\times10^7$ times) was defined as the fatigue strength (MPa). The obtained fatigue strength (MPa) for each test number is shown in Table 2. If the fatigue strength was 360 MPa or more, it was determined that excellent high temperature fatigue strength was obtained.

[Toughness Evaluation Test]

For each test number, the toughness of the steel material after thermal refining treatment was evaluated by the following method. First, a process for producing a simulated steel piston was performed with respect to the steel material of each test number to thereby prepare Charpy test specimens. Specifically, a steel bar with a diameter of 40 mm of each test number was heated for 30 minutes at a heating temperature of 1200° C. After being heated, the steel bar was subjected to hot forging to produce a round bar with a diameter of 20 mm. The finishing temperature in the hot forging was 950° C. or more for each test number.

After the hot forging, the round bar was subjected to a thermal refining treatment. Specifically, the round bar was heated for one hour at a heating temperature of 950° C., and thereafter was immersed in an oil bath at an oil temperature of 80° C. and quenched. After quenching, the round bar was subjected to tempering. In the tempering, the round bar after quenching was held for one hour at a heating temperature of 600° C., and thereafter was allowed to cool in the atmosphere.

A Charpy test specimen in accordance with JIS Z 2244 (2009) was prepared from the center position of a cross section perpendicular to the longitudinal direction of the round bar after the thermal refining treatment. A cross section perpendicular to the longitudinal direction of the Charpy test specimen was a square of 10 mm×10 mm, and the length was 55 mm. The notch was a U-notch shape, with the notch radius being set to 1 mm and the notch depth being set to 2 mm. The central axis of the Charpy test specimen matched the central axis of the round bar after the thermal refining treatment. Charpy test specimens that simulated the upper member of a steel piston were prepared by the above processes. A Charpy impact test was performed at normal temperature (20±15° C.) in accordance with the aforementioned JIS Standard, and impact values (J/cm$^2$) were measured. The measurement results are shown in Table 2. If the impact value was 70 J/cm² or more, it was determined that excellent toughness was obtained.

[Test Results]

The test results are shown in Table 2.

Referring to Table 2, in Test Numbers 1 to 9 and Test Number 25, the chemical composition was appropriate, and F1 satisfied Formula (1) and F2 satisfied Formula (2). In addition, the basicity in the LF of the secondary refining was within the range of 2.5 to 4.5. Therefore, the number of Mn sulfides was 100.0 per mm² or less, the number of coarse Mn sulfides having an equivalent circular diameter of 3.0 μm or more was within the range of 1.0 to 10.0 per mm², and the number of oxides was 15.0 per mm² or less. Therefore, the average width of flank wear VB of these test numbers was 100% or less relative to the reference value (average width of flank wear VB of Test Number 24), and excellent machinability was obtained. Further, in the high temperature fatigue strength test, the fatigue strength was 420 MPa or more. In other words, in the steel piston member (upper member or lower member), excellent high temperature fatigue strength was obtained. In addition, in the joint high temperature fatigue strength test, the fatigue strength was 360 MPa or more. In other words, excellent high temperature fatigue strength was obtained in a HAZ also. In addition, in the toughness evaluation test, the impact value was 70 J/cm² or more. In other words, excellent toughness was obtained in the steel piston member (upper member or lower member).

On the other hand, in Test Number 10, the C content was too low. Therefore, in the high temperature fatigue strength test, the fatigue strength was less than 420 MPa, and in the joint high temperature fatigue strength test, the fatigue strength was less than 360 MPa. In other words, the high temperature fatigue strength of the steel material was low, and the high temperature fatigue strength of a HAZ was also low.

In Test Number 11, the C content was too high. Therefore, the average width of flank wear VB was more than 100% relative to the reference value, and the machinability was low. In addition, in the toughness evaluation test, the impact value was less than 70 J/cm², and the toughness of the steel material was low.

In Test Number 12, the Mo content was too low. Therefore, in the high temperature fatigue strength test, the fatigue strength was less than 420 MPa.

In Test Number 13, the Mo content was too high. Therefore, in the toughness evaluation test, the impact value was less than 70 J/cm², and the toughness of the steel piston member (upper member or lower member) was low.

In Test Number 14, the V content was too low. Therefore, in the high temperature fatigue strength test, the fatigue strength was less than 420 MPa.

In Test Number 15, the V content was too high. Therefore, in the toughness evaluation test, the impact value was less than 70 J/cm², and the toughness of the steel piston member (upper member or lower member) was low.

In Test Number 16, the F1 value was less than the lower limit of Formula (1). Therefore, in the high temperature fatigue strength test, the fatigue strength was less than 420 MPa, and the high temperature fatigue strength of the steel piston member (upper member or lower member) was low. It is considered that, because the F1 value was less than the lower limit of Formula (1), carbides were not subjected to aging precipitation sufficiently.

In Test Number 17, the F1 value was more than the upper limit of Formula (1). Therefore, in the toughness evaluation test, the impact value was less than 70 J/cm².

In Test Number 18 and 19, the F2 value did not satisfy Formula (2). Therefore, in the high temperature fatigue strength test, the fatigue strength was less than 420 MPa, and the high temperature fatigue strength of the steel piston member (upper member or lower member) was low. It is considered that, because the F2 value did not satisfy Formula (2), carbides were not subjected to aging precipitation sufficiently.

In Test Number 20, the basicity in the LF during the secondary refining was too low. Therefore, the number of Mn sulfides was more than 100.0 per mm², and the number of coarse Mn sulfides was more than 10.0 per mm². Therefore, in the high temperature fatigue strength test, the fatigue strength was less than 420 MPa, and in the joint high temperature fatigue strength test, the fatigue strength was less than 360 MPa. In other words, the high temperature fatigue strength of the steel piston member (upper member or lower member) was low, and the high temperature fatigue strength of a HAZ was also low.

In Test Number 21, the basicity in the LF during the secondary refining was too low. Therefore, the number of Mn sulfides was more than 100.0 per mm², and the number of oxides was more than 15.0 per mm². Therefore, in the high temperature fatigue strength test, the fatigue strength was less than 420 MPa, and in the joint high temperature fatigue strength test, the fatigue strength was less than 360 MPa. In other words, the high temperature fatigue strength of the steel piston member (upper member or lower member) was low, and the high temperature fatigue strength of a HAZ was also low.

In Test Numbers 22 and 23, the basicity in the LF during the secondary refining was too high. Therefore, the number of coarse Mn sulfides was less than 1.0 per mm². Therefore, the average width of flank wear VB was more than 100/6 relative to the reference value, and the machinability was low.

Example 2

Whether or not it was possible to join different steel materials together was investigated assuming Test Number 2 in Table 1 as the upper member of the steel piston, and Test Number 24, and Test Numbers 26 and 27 having the chemical compositions shown in Table 3 as the lower member of the steel piston.

TABLE 3

| Test Number | Chemical Composition (unit is mass %; balance is Fe and impurities) | | | | | | | | | | | | | | | | |
|---|---|---|---|---|---|---|---|---|---|---|---|---|---|---|---|---|---|
| | C | Si | Mn | P | S | Cr | Mo | V | Al | N | O | Cu | Ni | Nb | Ca | F1 | F2 |
| 26 | 0.36 | 0.20 | 0.78 | 0.008 | 0.018 | 1.16 | 0.16 | — | 0.028 | 0.0050 | 0.0017 | — | — | — | — | 0.16 | 0.00 |
| 27 | 0.38 | 0.72 | 1.36 | 0.011 | 0.025 | 0.13 | 0.03 | 0.12 | 0.019 | 0.0140 | 0.0018 | — | — | — | — | 0.39 | 4.00 |

The chemical composition of the steel material of Test Number 26 was a chemical composition equivalent to SCM435 in the JIS Standard. The chemical composition of Test Number 27 was a chemical composition of a well-known non-heat treated steel containing V.

The steel materials of Test Numbers 26 and 27 were produced by the following method. The molten steels having the chemical compositions shown in Table 3 were subjected to primary refining using a converter by a well-known method. Further, after being tapped from the converter, the molten steel was subjected to a well-known deoxidation treatment. In addition, after the deoxidation treatment, a well-known deslagging treatment was performed. After the deslagging treatment, secondary refining was performed. Cast pieces were produced by a continuous casting process using the respective molten steels after the secondary refining. Each produced cast piece was subjected to blooming to produce a billet. The surface temperature before the start of blooming of the cast piece of each test number was within the range of 1000 to 1200° C. In addition, after blooming, each billet was subjected to finish rolling using a continuous mill. The rolling finishing temperature of each test number was within the range of 850 to 1100° C. Steel material to be used for members of a steel piston that is a steel bar with a diameter of 40 mm was produced by the above processes.

[Joint High Temperature Fatigue Strength Test]

Steel materials were joined by friction joining by combining the steel materials as shown in Test Numbers A1 to A3 in Table 4 to investigate whether or not it was possible to join together steel materials of different steel grades. Specifically, in Test Number A1, the upper member of the steel piston was assumed to be of the steel material of Test Number 2, and the lower member was assumed to be of the steel material of Test Number 24. In Test Number A2, the upper member was assumed to be of the steel material of Test Number 2, and the lower member was assumed to be of the steel material of Test Number 25. In Test Number A3, the upper member was assumed to be of the steel material of Test Number 2, and the lower member was assumed to be of the steel material of Test Number 26. The chemical compositions of Test Numbers 2 and 24 to 26 were different to each other.

First, the upper member and the lower member of each of the test numbers A1 to A3 were prepared. A steel bar with a diameter of 40 mm was prepared as the upper member, and a steel bar with a diameter of 40 mm was prepared as the lower member. The upper member and the lower member of each test number were heated for 30 minutes at a heating temperature of 1200° C. After being heated, each steel bar was subjected to hot forging to produce a round bar with a diameter of 30 mm. The finishing temperature in the hot forging was 950° C. or more for each test number.

After the hot forging, the round bar was subjected to a thermal refining treatment. Specifically, the round bar was heated for one hour at a heating temperature of 950° C., and thereafter was immersed in an oil bath at an oil temperature of 80° C. and quenched. After quenching, the round bar was subjected to tempering. In the tempering, the round bar after quenching was held for one hour at a heating temperature of 600° C., and thereafter was allowed to cool in the atmosphere.

Machining was performed with respect to the axial direction (longitudinal direction) of the round bar (upper member and lower member) after the thermal refining treatment to prepare a rough round bar specimen having a diameter of 20 mm and a length of 150 mm. Hereinafter, the rough round bar specimen of the upper member of each test number is referred to as "upper member test specimen", and the rough round bar specimen of the lower member of each test number is referred to as "lower member test specimen. The central axis of the upper member test specimen and the lower member test specimen of each test number matched the central axis of the round bar after the thermal refining treatment. The ends of the upper member test specimen and the lower member test specimen of each test number were butted together, and friction joining was performed to prepare a joined round bar specimen on the assumption of preparing a steel piston. In the friction joining, the friction pressure was set to 100 MPa and the friction time was set to 5 seconds. The upset pressure (applied pressure from the two ends of the rough specimens to the joint) was set to 200 MPa, and the upset time was set to 5 seconds. The rotation speed during friction joining was set to 2000 rpm, and the burn-off length was set within the range of 5 to 12 mm.

The joined portion of the test specimen after joining was subjected to an ultrasonic inspection test and a radiographic test to investigate whether or not defects were present at the joined portion. The test results are shown in Table 4.

TABLE 4

| | Combination | Joining |
|---|---|---|
| A1 | Upper Member Test Specimen: Test Number 2 | ○ |
| | Lower Member Test Specimen: Test Number 24 | |
| A2 | Upper Member Test Specimen: Test Number 2 | ○ |
| | Lower Member Test Specimen: Test Number 26 | |
| A3 | Upper Member Test Specimen: Test Number 2 | ○ |
| | Lower Member Test Specimen: Test Number 27 | |

The symbol "○" in the "Joining" column in Table 4 indicates that friction joining was possible, and that the upper member test specimen and the lower member test specimen were firmly joined, and that defects at the joined portion were not observed in the ultrasonic inspection test and the radiographic test. As shown in Table 4, in each of Test Numbers A1 to A3, it was possible to perform friction joining between the upper member and the lower member of a different steel grade from the steel grade of the upper member.

An embodiment of the present invention has been described above. However, the foregoing embodiment is merely an example for implementing the present invention. Accordingly, the present invention is not limited to the above embodiment, and the above embodiment can be appropriately modified and implemented within a range which does not deviate from the gist of the present invention.

The invention claimed is:

1. A steel piston, comprising:
an upper member including at least a top land of a crown portion, and
a lower member arranged below the upper member and fixed to the upper member, the lower member including a skirt portion and a piston pin hole into which a piston pin is to be inserted;
the upper member having a chemical composition which consists of, in mass %,
C: 0.15 to 0.30%,
Si: 0.02 to 1.00%,
Mn: 0.20 to 0.80%,
P: 0.020% or less,
S: 0.028% or less, Cr: 0.80 to 1.50%,
Mo: 0.08 to 0.40%,
V: 0.10 to 0.40%,
Al: 0.005 to 0.060%,
N: 0.0150% or less,
O: 0.0030% or less,
Cu: 0 to 0.50%,
Ni: 0 to 1.00%,
Nb: 0 to 0.100%, and
the balance: Fe and impurities,
and satisfies Formula (1) and Formula (2),
wherein:
at a cross section parallel to an axial direction of the steel piston in the upper member,
a number of Mn sulfides containing 10.0 mass % or more of Mn and containing 10.0 mass % or more of S is 100.0 per mm$^2$ or less,
among the Mn sulfides, a number of coarse Mn sulfides having an equivalent circular diameter of 3.0 μm or more is within a range of 1.0 to 10.0 per mm$^2$, and
a number of oxides containing 10.0 mass % or more of oxygen is 15.0 per mm$^2$ or less;

$$0.42 \leq Mo+3V \leq 1.50 \tag{1}$$

$$V/Mo \geq 0.50 \tag{2}$$

where, a content (mass %) of a corresponding element is substituted for each symbol of an element in Formula (1) and Formula (2).

2. The steel piston according to claim 1, wherein:
the chemical composition of the upper member contains one or more elements selected from a group consisting of:
Cu: 0.01 to 0.50%,
Ni: 0.01 to 1.00%, and
Nb: 0.010 to 0.100%.

3. The steel piston according to claim 1, wherein:
the chemical composition of the lower member is different from the chemical composition of the upper member.

4. The steel piston according to claim 1,
the lower member having a chemical composition which consists of, in mass %,
C: 0.15 to 0.30%,
Si: 0.02 to 1.00%,
Mn: 0.20 to 0.80%,
P: 0.020% or less,
S: 0.028% or less,
Cr: 0.80 to 1.50%,
Mo: 0.08 to 0.40%,
V: 0.10 to 0.40%,
Al: 0.005 to 0.060%,
N: 0.0150% or less,
O: 0.0030% or less,
Cu: 0 to 0.50%,
Ni: 0 to 1.00%,
Nb: 0 to 0.100%, and
the balance: Fe and impurities,
and satisfies Formula (1) and Formula (2),
wherein:
at a cross section parallel to an axial direction of the steel piston in the lower member,
a number of Mn sulfides containing 10.0 mass % or more of Mn and containing 10.0 mass % or more of S is 100.0 per mm$^2$ or less,
among the Mn sulfides, a number of coarse Mn sulfides having an equivalent circular diameter of 3.0 μm or more is within a range of 1.0 to 10.0 per mm$^2$, and
a number of oxides containing 10.0 mass % or more of oxygen is 15.0 per mm$^2$ or less;

$$0.42 \leq Mo+3V \leq 1.50 \tag{1}$$

$$V/Mo \geq 0.50 \tag{2}$$

where, a content (mass %) of a corresponding element is substituted for each symbol of an element in Formula (1) and Formula (2).

5. The steel piston according to claim 2, wherein:
the chemical composition of the lower member is different from the chemical composition of the upper member.

6. The steel piston according to claim 2,
the lower member having a chemical composition which consists of, in mass %,
C: 0.15 to 0.30%,
Si: 0.02 to 1.00%,
Mn: 0.20 to 0.80%,
P: 0.020% or less,
S: 0.028% or less,
Cr: 0.80 to 1.50%,
Mo: 0.08 to 0.40%,
V: 0.10 to 0.40%,
Al: 0.005 to 0.060%,
N: 0.0150% or less,
O: 0.0030% or less,
Cu: 0 to 0.50%,
Ni: 0 to 1.00%,
Nb: 0 to 0.100%, and
the balance: Fe and impurities,
and satisfies Formula (1) and Formula (2),
wherein:
at a cross section parallel to an axial direction of the steel piston in the lower member,
a number of Mn sulfides containing 10.0 mass % or more of Mn and containing 10.0 mass % or more of S is 100.0 per mm$^2$ or less,
among the Mn sulfides, a number of coarse Mn sulfides having an equivalent circular diameter of 3.0 μm or more is within a range of 1.0 to 10.0 per mm$^2$, and
a number of oxides containing 10.0 mass % or more of oxygen is 15.0 per mm$^2$ or less;

$$0.42 \leq Mo+3V \leq 1.50 \tag{1}$$

$$V/Mo \geq 0.50 \tag{2}$$

where, a content (mass %) of a corresponding element is substituted for each symbol of an element in Formula (1) and Formula (2).

* * * * *